(12) United States Patent
Reichelderfer et al.

(10) Patent No.: US 11,678,769 B2
(45) Date of Patent: Jun. 20, 2023

(54) AUTOMATED COOKING SYSTEM AND METHODS OF MANAGING BASKET WORKFLOW FOR FOOD PREPARATION

(71) Applicant: Henny Penny Corporation, Eaton, OH (US)

(72) Inventors: Kimberly Reichelderfer, Yellow Springs, OH (US); Thomas M. Smith, Lewisburg, OH (US); Adrian Jason Pereira, Dayton, OH (US); Michael Maddux, Kettering, OH (US)

(73) Assignee: Henny Penny Corporation, Eaton, OH (US)

( * ) Notice: Subject to any disclaimer, the term of this patent is extended or adjusted under 35 U.S.C. 154(b) by 182 days.

(21) Appl. No.: 17/244,096

(22) Filed: Apr. 29, 2021

(65) Prior Publication Data

US 2022/0346599 A1 Nov. 3, 2022

(51) Int. Cl.
*A47J 37/12* (2006.01)
*F25D 13/06* (2006.01)

(52) U.S. Cl.
CPC ....... *A47J 37/1228* (2013.01); *A47J 37/1219* (2013.01); *A47J 37/1266* (2013.01); *F25D 13/06* (2013.01)

(58) Field of Classification Search
CPC .............. A47J 37/1228; A47J 37/1219; A47J 37/1266; A47J 37/1295; A47J 37/1276; A47J 37/1271; A47J 37/12

(Continued)

(56) References Cited

U.S. PATENT DOCUMENTS

| 3,164,406 A | 1/1965 | Barry |
| 4,722,267 A | 2/1988 | Galockin et al. |

(Continued)

FOREIGN PATENT DOCUMENTS

| JP | S63288117 A | 11/1988 |
| KR | 10-0984964 | 10/2010 |

(Continued)

OTHER PUBLICATIONS

International Searching Authority, Search Report and Written Opinion issued in International Patent Application No. PCT/US2018/063272 dated Feb. 5, 2019 (16 pages).

(Continued)

*Primary Examiner* — Phuong T Nguyen
(74) *Attorney, Agent, or Firm* — Wood Herron & Evans LLP

(57) ABSTRACT

An automated cooking system is provided for adding time and labor efficiencies in food production environments such as restaurants. The automated cooking system includes at least a fryer, a dispensing freezer, a hot holding station, a plurality of baskets, and a gantry system. The gantry system includes a gantry control for a gantry, configured to engage and move each of the baskets. A method for managing basket workflow during food preparation at an automated cooking system is described. Further, a method for managing basket workflow at a dispensing freezer during food preparation at an automated cooking system is described. The automated cooking system and methods provide repetition of basket loading and discharge cycles such that the gantry can fully manage and automate cooking using up to 6 or more baskets at the fryer, thereby maximizing food product throughput in the standard footprint space for the fryer.

24 Claims, 23 Drawing Sheets

(58) Field of Classification Search
USPC .............. 99/331, 403, 404, 409, 427, 419;
426/302, 438, 523; 219/430, 432
See application file for complete search history.

(56) References Cited

U.S. PATENT DOCUMENTS

| | | | |
|---|---|---|---|
| 4,901,633 | A | 2/1990 | De Longhi |
| 4,913,038 | A | 4/1990 | Burkett et al. |
| 4,951,558 | A | 8/1990 | Figliuzzi |
| 5,112,633 | A | 5/1992 | Benson et al. |
| 5,142,968 | A | 9/1992 | Caron et al. |
| 5,172,328 | A | 12/1992 | Cahlander et al. |
| 5,191,918 | A | 3/1993 | Cahlander et al. |
| 5,224,415 | A | 7/1993 | McFadden et al. |
| 5,230,279 | A | 7/1993 | McFadden et al. |
| 5,232,151 | A | 8/1993 | Mercer et al. |
| 5,263,406 | A | 11/1993 | Chiu |
| 5,973,297 | A | 10/1999 | Winter et al. |
| 6,165,525 | A | 12/2000 | Rolle et al. |
| 6,427,583 | B1 | 8/2002 | Shimansky et al. |
| 6,588,325 | B1 | 7/2003 | Savage |
| 6,869,633 | B2 | 3/2005 | Sus et al. |
| 7,100,497 | B2 | 9/2006 | Shandross |
| 7,343,719 | B2 | 3/2008 | Sus et al. |
| 7,441,388 | B2 | 10/2008 | Sus et al. |
| 7,775,156 | B2 | 8/2010 | Sus et al. |
| 3,037,812 | A1 | 10/2011 | Sumner, Sr. |
| 8,034,390 | B2 | 10/2011 | Sus et al. |
| 8,065,954 | B2 | 11/2011 | Foster et al. |
| 8,549,993 | B2 | 10/2013 | Foster et al. |
| 8,551,331 | B2 | 10/2013 | Burkett et al. |
| 8,584,579 | B1 | 11/2013 | Sumner, Sr. |
| 8,618,447 | B2 | 12/2013 | De' Longhi |
| 8,850,965 | B2 | 10/2014 | Popeil et al. |
| 10,205,605 | B2 | 2/2019 | Han |
| 10,641,274 | B2 | 5/2020 | Chien et al. |
| 2003/0192435 | A1 | 10/2003 | McNair |
| 2003/0205147 | A1 | 11/2003 | Schackmuth et al. |
| 2004/0060456 | A1 | 4/2004 | Chung |
| 2007/0214968 | A1 | 9/2007 | Larson et al. |
| 2007/0251517 | A1 | 11/2007 | Sus et al. |
| 2008/0121578 | A1 | 5/2008 | Burkett et al. |
| 2008/0237104 | A1 | 10/2008 | Foster et al. |
| 2009/0084273 | A1 | 4/2009 | Lackman et al. |
| 2010/0037782 | A1 | 2/2010 | Foster et al. |
| 2011/0203570 | A1 | 8/2011 | Popeil et al. |
| 2012/0167778 | A1 | 7/2012 | Popeil et al. |
| 2014/0227411 | A1 | 8/2014 | Popeil et al. |
| 2014/0302211 | A1 | 10/2014 | Rose et al. |
| 2017/0095118 | A1 | 4/2017 | Loss et al. |
| 2018/0033005 | A1 | 2/2018 | Sines et al. |
| 2019/0032958 | A1 | 1/2019 | Ohse et al. |
| 2020/0046168 | A1 | 2/2020 | Sinnet et al. |
| 2020/0305464 | A1 | 10/2020 | Hohler et al. |
| 2020/0305646 | A1 * | 10/2020 | Hohler ................ A47J 37/1276 |
| 2021/0235929 | A1 | 8/2021 | Perkins et al. |

FOREIGN PATENT DOCUMENTS

| | | | |
|---|---|---|---|
| KR | 10-1288282 | | 7/2013 |
| KR | 101288282 | * | 7/2013 |
| KR | 10-2017-0064979 | | 6/2017 |
| KR | 20170064979 | * | 6/2017 |
| WO | 2019108909 A1 | | 6/2019 |
| WO | 2019136406 A1 | | 7/2019 |

OTHER PUBLICATIONS

International Searching Authority, Preliminary Report on Patentability issued in International Patent Application No. PCT/US2018/063272 dated Dec. 2, 2019 (20 pages).
European Patent Office, Extended Search Report issued in EP Application No. 22168774.2-1004 dated Sep. 22, 2022 (10 pages).
European Patent Office, Extended Search Report issued in EP Application No. 22170595.7-1004 dated Sep. 28, 2022 (9 pages).
European Patent Office, Extended Search Report issued in EP Application No. 221687775.5-1004 dated Sep. 30, 2022 (10 pages).

* cited by examiner

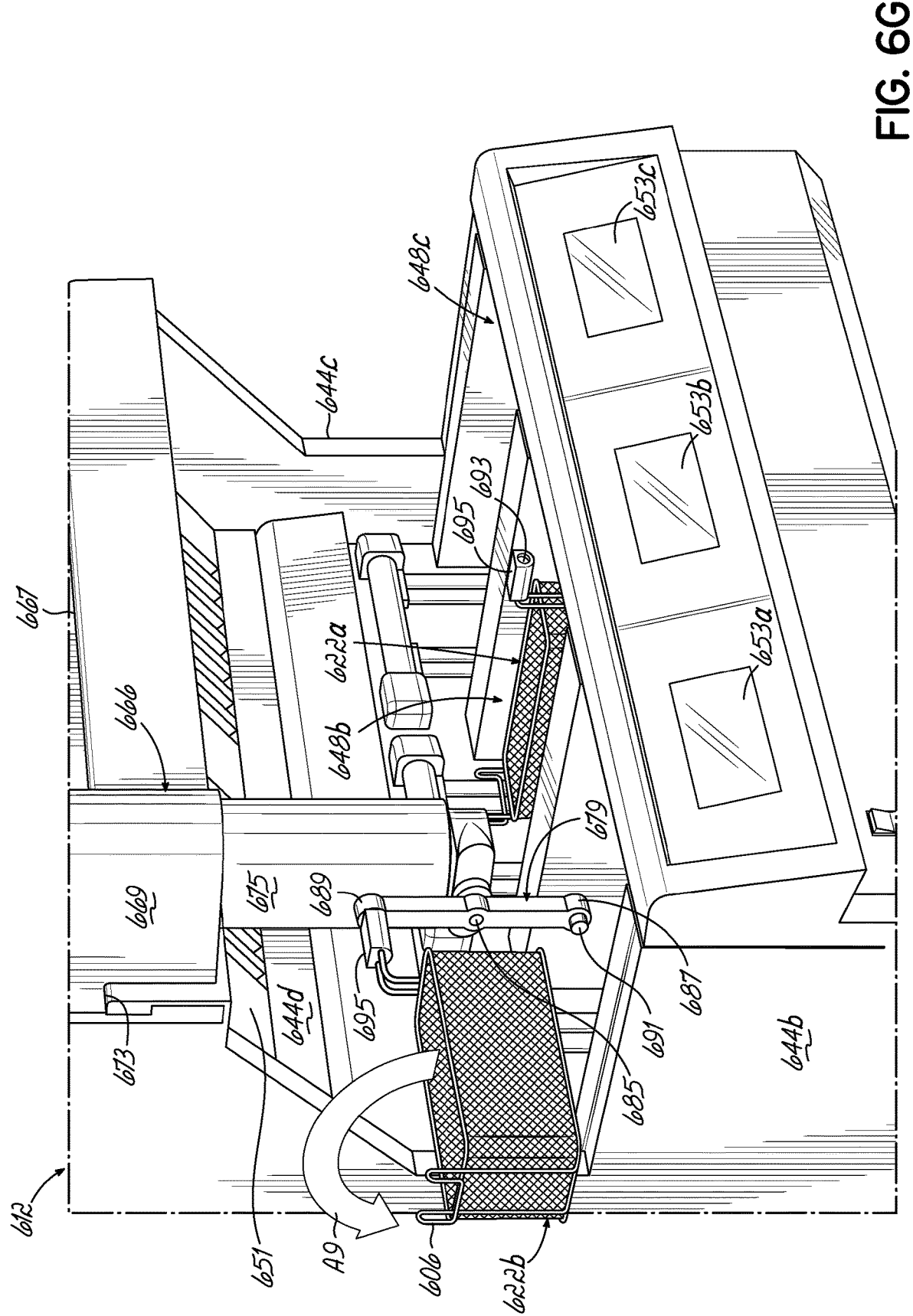

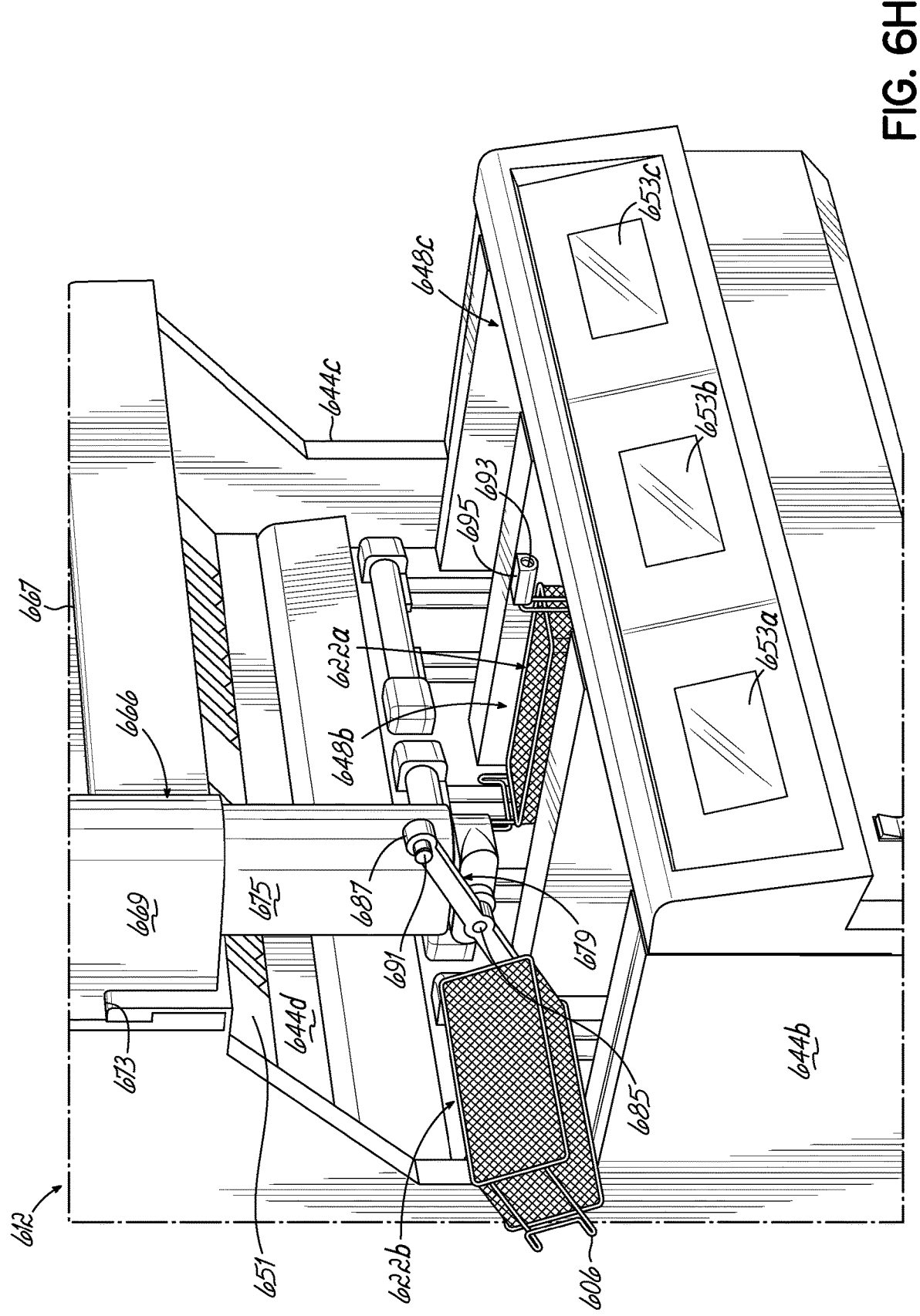

AUTOMATED COOKING SYSTEM AND METHODS OF MANAGING BASKET WORKFLOW FOR FOOD PREPARATION

TECHNICAL FIELD

This application relates generally to food product cooking systems and methods. More specifically, this application describes mechanisms and methods for adding time and labor efficiencies in food production environments such as restaurants.

BACKGROUND

Cooking apparatuses, such as fryers, are used to cook various food products, e.g., poultry, fish, potato products, and the like. Such cooking apparatuses may include one or more cooking chambers, e.g., fryer pots or vats, which may be filled with a cooking medium, e.g., an oil, a liquid shortening, or a meltable-solid shortening. Such cooking apparatuses also may include a heating element, e.g., an electrical heating element, such as a heating coil, or a gas heating element, such as a gas burner and gas conveying tubes, which heats the cooking medium in the cooking chamber. After the cooking medium reaches a preset cooking temperature, food products are placed into the cooking medium such that the food products are cooked in the cooking medium. For example, the food products may be positioned inside a basket, e.g., a wire basket, and submerged in the cooking medium for a predetermined amount of time sufficient to cook the food products. Conventional fryers typically require basket movement and workflow to be handled manually by an operator. In such fryers, the maximum production of the fryer is often limited by the responsiveness of the operator and their ability to manage multiple baskets and cooking tasks at the same time.

However, restaurants continue to strive to increase production in order to satisfy customer demand. One way to increase production is to utilize a high-volume fryer, such as by replacing a restaurant's pre-existing traditional open fryer with a high-volume fryer. However, high-volume fryers are typically relatively large, and restaurants must operate within the space constraints imposed by the buildings which they occupy. As a result, restaurant equipment, including fryers, must be sized to fit within certain parameters. For example, kitchen layouts may allow a particular amount of space for a fryer and may be unable to accommodate fryers having footprints greater than that space. Some restaurants may allow a footprint of about 90-100 inches by about 30 inches for a fryer, as well as an associated preparation or holding area. A high-volume fryer of a conventional design may require significantly more space than this. Many restaurants would be required to undergo substantial building renovations, replace previously installed hoods, or sacrifice space intended for other uses in order to reap the benefits of high-volume fryers. Those reconfigurations are expensive, highly disfavored, and sometimes impossible.

Thus, it would be desirable to provide systems and methods to cook food product in a more efficient manner, specifically with regard to time and labor considerations within a restaurant, while also achieving higher maximum production levels than traditional fryer systems and methods relying on manual manipulation and handling of baskets.

SUMMARY

In accordance with embodiments of the invention, an automated cooking system is described. The automated cooking system and a corresponding method for managing basket workflow during food preparation at the automated cooking system avoid the problems associated with basket movement and workflow, traditionally handled manually by a human operator. Specifically, the automated cooking system described herein provides for systems and methods to cook food product in a more efficient manner with regard to both time and labor considerations within the constraints of a restaurant.

In one implementation of the invention, a method is provided for managing basket workflow during food preparation at an automated cooking system. The automated cooking system includes a gantry system, a dispensing freezer, a fryer, and a hot holding station. The gantry system includes a gantry. The fryer includes a plurality of fryer vats each of which includes at least one platform for receiving and moving a basket. The method includes performing, by the gantry system, a plurality of basket loading cycles. Each basket loading cycle includes picking up an empty basket from one of the platforms at the fryer with the gantry, moving the gantry and the empty basket to the dispensing freezer, dropping off the empty basket at the dispensing freezer, picking up a filled basket from the dispensing freezer, moving the gantry and the filled basket to a selected one of the platforms at the fryer, and dropping off the filled basket onto the selected one of the platforms to allow the fryer to cook food product in the filled basket. The method further includes performing, by the gantry system, a plurality of basket discharge cycles. Each basket discharge cycle includes picking up a filled basket containing food product that has been cooked by the fryer from one of the platforms at the fryer with the gantry, moving the gantry and the filled basket to the hot holding station, actuating the filled basket with the gantry to open the filled basket and thereby discharge the cooked food product into the hot holding station to empty the basket, moving the gantry and the empty basket to another selected one of the platforms at the fryer, and dropping off the empty basket onto the another selected one of the platforms. The automated cooking system prioritizes and orders the basket loading cycles and the basket discharge cycles for the gantry system to satisfy varying levels of demand for cooked food products from the automated cooking systems.

In one embodiment, the method further includes moving only one basket at a time with the gantry during the basket loading cycles and the basket discharge cycles.

In another embodiment, the method further includes preventing uncontrolled rotational movements of any basket during engagement of the basket with the gantry to avoid impacts of the basket, engaged with the gantry, with any other basket at the automated cooking system.

In a further embodiment, the steps of picking up a basket with the gantry in the basket loading cycles and the basket discharge cycles of the method further includes clamping the gantry into engagement with only a single pickup point defined along a front surface of the basket.

In yet another embodiment, the fryer includes at least six platforms defining cooking stations for a basket at the plurality of fryer vats. Additionally, the method further includes managing workflow of at least six baskets simultaneously with the gantry system to move the at least six baskets between the dispensing freezer, the fryer, and the hot holding station to complete cooking cycles for food products loaded into the at least six baskets.

In one embodiment, the gantry system completes at least one of the basket loading cycles or one of the basket discharge cycles in a time period of less than 20 seconds.

In another embodiment, the gantry system completes both one of the basket loading cycles and one of the basket discharge cycles in a time period of less than 35 seconds.

In a further embodiment, the method further includes lowering a filled basket, by one of the platforms at the fryer, into a heated cooking medium within a corresponding fryer vat to cook the food products in the basket. The method further includes maintaining the filled basket within the corresponding fryer vat for a cooking cycle time defined for cooking the food products in the basket. The method further includes lifting the filled basket, by one of the platforms at the fryer, out of the heated cooking medium after the cooking cycle time has elapsed, to position the filled basket with cooked food products in a position ready for pickup by the gantry system.

In yet another embodiment, the dispensing freezer and the hot holding station are positioned on opposite lateral sides of the fryer and the gantry system moves baskets laterally between the dispensing freezer, the hot holding stations, and the plurality of fryer vats located between the dispensing freezer and the hot holding station.

In one embodiment, the baskets may be loaded with different types of food products for cooking cycles. The step of the performing a plurality of basket discharge cycles of the method further comprises moving, during one of the basket discharge cycles, a first filled basket that contains a first type of food product to a first height above a receptacle at the hot holding station, such that actuation of the first filled basket to open with the gantry causes discharge of the first type of food product into the receptacle by dropping the first type of food product from the first height. The method further comprises moving, during another of the basket discharge cycles, a second filled basket that contains a second type of food product to a second height above the receptacle at the hot holding station, such that actuation of the second filled basket to open with the gantry causes discharge of the second type of food product into the receptacle by dropping the second type of food product from the second height. The first type of food product is different than the second type of food product, and the first and second heights are different.

In a further embodiment, the dispensing freezer includes a staging shelf and a basket movement receptacle. Further, during each of the basket loading cycles, the gantry system drops off the empty basket onto the staging shelf, and the gantry system picks up the filled basket from the basket movement receptacle. Moreover, the empty basket and the filled basket are different baskets at the dispensing freezer.

In another embodiment, between basket loading cycles at the dispensing freezer, the method further includes moving the basket movement receptacle to a position adjacent the empty basket on the staging shelf, pivoting the staging shelf out of a movement path of the basket movement receptacle such that the empty basket is supported on the basket movement receptacle, and moving the empty basket with the basket movement receptacle to a filling location at the dispensing freezer where the empty basket is filled with food product, and to a pickup position after the basket is filled with food product for pickup by the gantry system in a subsequent one of the basket loading cycles.

In a further implementation of the invention, a method is provided for managing basket workflow at a dispensing freezer during food preparation of an automated cooking system. The dispensing freezer includes a staging shelf and a basket moving receptacle. The method includes receiving an empty basket from a gantry of the automated cooking system at the staging shelf, moving the basket movement receptacle to a position adjacent the empty basket on the staging shelf, pivoting the staging shelf out of a movement path of the basket movement receptacle such that the empty basket is supported on the basket movement receptacle, moving the empty basket with the basket movement receptacle to a filling location at the dispensing freezer where the empty basket can be filled with food product to become a filled basket, holding the filled basket with the basket movement receptacle at a pickup position where the gantry can pick up the filled basket, and pivoting the staging shelf back to a deployed position so that the staging shelf is ready to receive another empty basket from the gantry.

In one embodiment, the basket movement receptacle defines a generally U-shaped support surrounding an open slot facing towards the staging shelf. The method further includes transferring the empty basket from support on the staging shelf to support by the basket movement receptacle during the steps of moving the basket movement receptacle to the position adjacent the empty basket and pivoting the staging shelf out of the movement path of the basket movement receptacle. Moreover, the staging shelf pivots, through the open slot of the basket movement receptacle, from a horizontal orientation to a vertical orientation.

In another embodiment, the staging shelf and the basket movement receptacle are sized such that the basket movement receptacle can move along the movement path past the staging shelf in either the horizontal or vertical orientation when the basket movement receptacle is not engaged with a basket. Additionally, the staging shelf and the basket movement receptacle are sized such that the basket movement receptacle can move along the movement path past the staging shelf only when the staging shelf is in the vertical orientation when the basket movement receptacle is engaged with a basket.

In another implementation of the invention, an automated cooking system includes a fryer including a plurality of fryer vats each configured to hold a cooking medium and each including at least one platform for receiving and moving a basket into and out of the cooking medium, a dispensing freezer positioned adjacent to one lateral side of the fryer, a hot holding station positioned adjacent to an opposite lateral side of the fryer, a plurality of baskets configured to receive and hold food products during cooking cycles at the fryer, and a gantry system including a gantry control operatively coupled to a gantry configured to engage and move each of the baskets. The gantry control operates the gantry system to perform a plurality of basket loading cycles and to perform a plurality of basket discharge cycles. Each basket loading cycle is defined at least by picking up an empty basket from one of the platforms at the fryer with the gantry, moving the gantry and the empty basket to the dispensing freezer, dropping off the empty basket at the dispensing freezer, picking up a filled basket from the dispensing freezer, moving the gantry and the filled basket to a selected one of the platforms at the fryer, and dropping off the filled basket onto the selected one of the platforms to allow the fryer to cook food product in the filled basket. Each basket discharge cycle is defined at least by picking up a filled basket containing food product that has been cooked by the fryer from one of the platforms at the fryer with the gantry, moving the gantry and the filled basket to the hot holding station, actuating the filled basket with the gantry to open the filled basket and thereby discharge the cooked food product into the hot holding station to empty the basket, moving the gantry and the empty basket to another selected one of the platforms at the fryer, and dropping off the empty basket onto the another selected one of the platforms. Further, the gantry control prioritizes and orders the basket loading cycles and the basket discharge cycles for the gantry system to satisfy varying levels of demand for cooked food products from the fryer.

In one embodiment, each of the plurality of baskets of the automated cooking system include a single pickup point facing towards the gantry system. Further, the gantry system of the automated cooking system includes a clamping gripper that clamps into engagement with the single pickup point of one of the baskets to move only one of the baskets at a time during the basket loading cycles and the basket discharge cycles.

In another embodiment, the clamping gripper of the gantry system of the automated cooking system engages with each basket in such a manner to prevent uncontrolled rotational movements of the basket during engagement of the basket with the gantry, to thereby avoid impacts of the basket engaged with the gantry with any other basket at the automated cooking system.

In yet another embodiment, the dispensing freezer of the automated cooking system further includes a staging shelf, which is movable between a generally horizontal deployed position configured to receive an empty basket from the gantry system and a generally vertical stowed position. Additionally, the dispensing freezer of the automated cooking system further includes a basket movement receptacle, which is configured to pick up the empty basket from the staging shelf and move it at least one of a filling location or a pickup position such that the empty basket can be refilled with food products to be cooked and then picked up by the gantry system.

In a further embodiment, the basket movement receptacle of the automated cooking system defines a generally U-shaped support surrounding an open slot facing towards the staging shelf, such that the staging shelf pivots through the open slot from the deployed position to the stowed position to transfer the empty basket to the basket movement receptacle when the basket movement receptacle is positioned adjacent the staging shelf and the empty basket.

In yet another implementation of the invention, a method is provided for managing basket workflow during food preparation at an automated cooking system. The automated cooking system includes a gantry system, a dispensing freezer, a fryer, and a hot holding station. The gantry system includes a gantry. The fryer includes a plurality of fryer vats each of which includes at least one platform for receiving and moving a basket. The method includes performing, by the gantry system, a basket loading cycle. Each basket loading cycle includes picking up a filled basket from the dispensing freezer, moving the gantry and the filled basket to a selected one of the platforms at the fryer, and dropping off the filled basket onto the selected one of the platforms to allow the fryer to cook food product in the filled basket. The method further includes performing, by the gantry system, a of basket discharge cycle. Each basket discharge cycle includes picking up a filled basket containing food product that has been cooked by the fryer from one of the platforms at the fryer with the gantry, moving the gantry and the filled basket to the hot holding station, and actuating the filled basket with the gantry to open the filled basket and thereby discharge the cooked food product into the hot holding station to empty the basket. The automated cooking system prioritizes and orders the basket loading cycles and the basket discharge cycles for the gantry system to satisfy varying levels of demand for cooked food products from the automated cooking systems.

In one embodiment, the basket loading cycle of the method for managing basket workflow further includes picking up an empty basket from one of the platforms at the fryer with the gantry, moving the gantry and the empty basket to the dispensing freezer, and dropping off the empty basket at the dispensing freezer. Moreover, the basket discharge cycle of the method for managing basket workflow further includes moving the gantry and the empty basket to another selected one of the platforms at the fryer and dropping off the empty basket onto the another selected one of the platforms.

In another embodiment, the gantry system completes at least one of the basket loading cycles or one of the basket discharge cycles in a time period of less than 20 seconds.

In a further embodiment, the gantry system completes both one of the basket loading cycles and one of the basket discharge cycles in a time period of less than 35 seconds.

The steps and elements described herein as part of various embodiments and implementations can be reconfigured and combined in different combinations to achieve the desired technical effects as may be desired. To this end, the embodiments and implementations can be combined in any combination or sub-combination.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitute a part of this specification, illustrate one or more embodiments of the invention and, together with the general description given above and the detailed description given below, serve to explain the one or more embodiments of the invention.

FIG. 6G is a front perspective view similar to FIG. 6F, with the transport assembly positioned proximate the left-side wall panel of the fryer and with the manipulator rotating about the horizontal axis to tilt the second basket.

FIG. 6H is a front perspective view similar to FIG. 6G, with the manipulator rotated about the horizontal axis to tilt the second basket.

DETAILED DESCRIPTION

Figure 1:
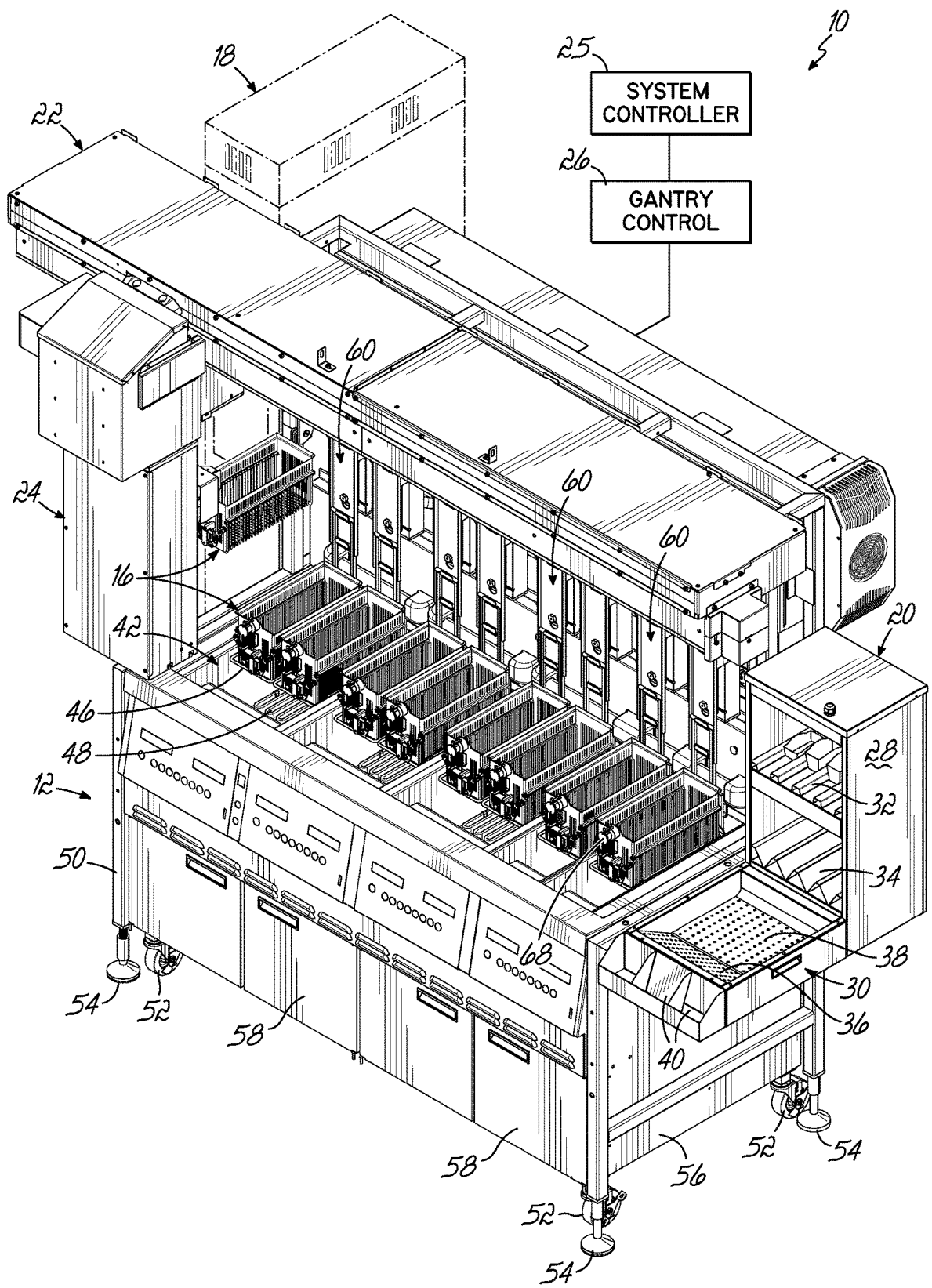
FIG. 1 is a front perspective view of an automated cooking system in accordance with an embodiment of the invention.
Figure 2:
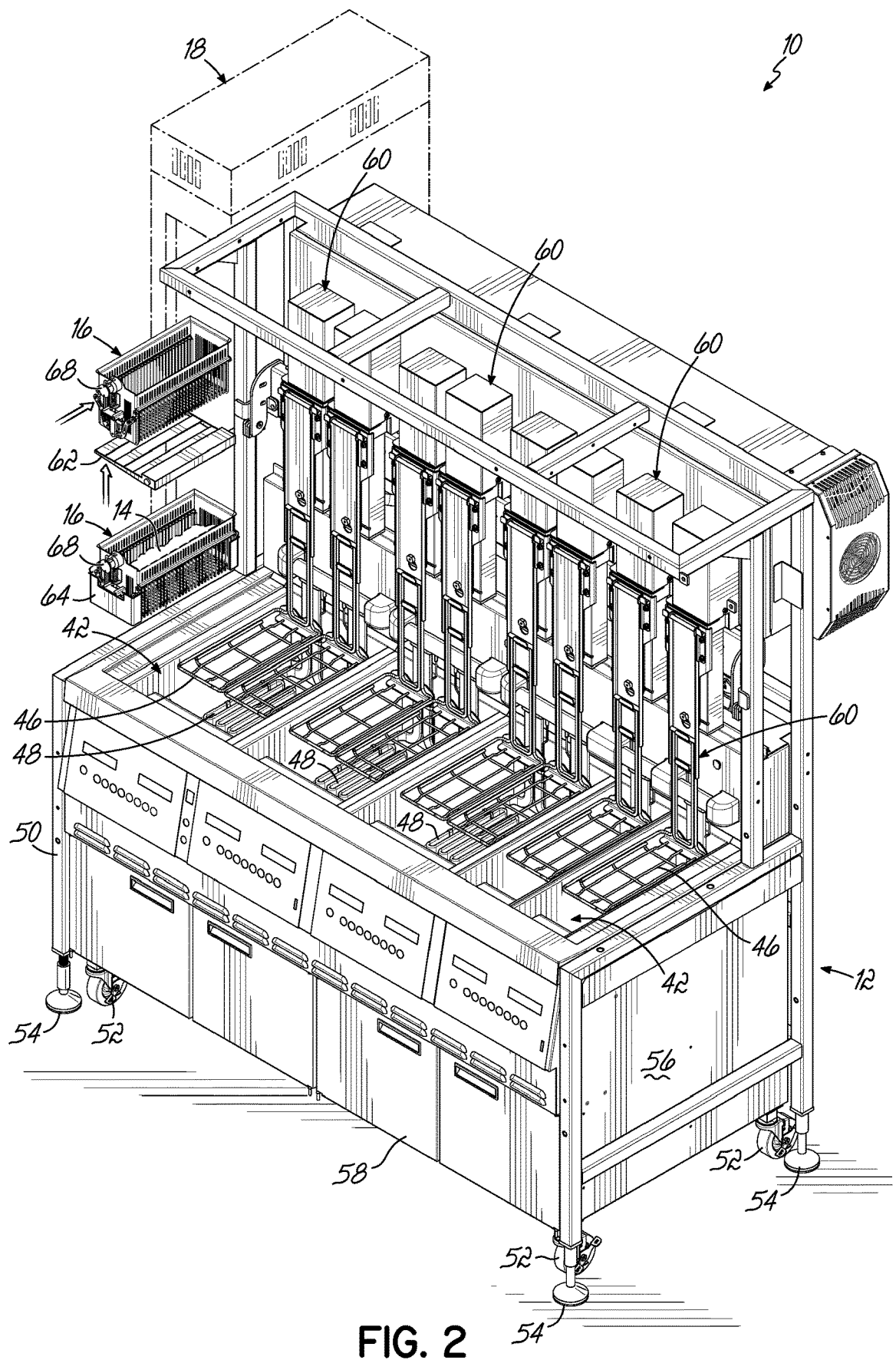
FIG. 2 is a front perspective view of a fryer included in the automated cooking system of FIG. 1, but with the gantry removed for purposes of illustration.

With reference to FIGS. 1 and 2, an automated cooking system 10 including a fryer 12 is shown in accordance with one exemplary embodiment. As set forth in further detail below, the system 10 and fryer 12 provide improved efficiency in cooking operations. The cooking system 10 achieves the increased production by efficiently managing the workflow of baskets 16 moving between a dispensing freezer 18, the fryer 12, and a hot holding station 20. More specifically, the workflow of baskets 16 is primarily achieved using a gantry system 22. The gantry system 22 includes a gantry 24 and a gantry control 26, which may be a part of or separate from a system controller 25 for the automated cooking system 10. The system described herein provides for cooking food product 14 in a more efficient manner with regard to both time and labor considerations within the constraints of a restaurant. The features of the automated cooking system 10 and the fryer 12 are set forth in further detail below to clarify each of these functional advantages and other benefits provided in this disclosure. Other advantages and technical effects of the embodiments of this invention will become evident to one skilled in the art from the following description.

A brief description of the environmental context (including the equipment surrounding the fryer 12) is now provided before turning attention to a more detailed explanation of the gantry system 22 and how it manages the workflow of baskets 16 around the fryer 12 to achieve the technical advantages noted above.

Continuing with reference to FIG. 1, an exemplary automated cooking system 10 is shown. The automated cooking system 10 includes the fryer 12, a plurality of baskets 16, a dispensing freezer 18, a hot holding station 20, and a gantry system 22. The dispensing freezer 18 is of a mostly conventional design, and thus, is not shown in significant detail in the Figures. However, the dispensing freezer 18 shown in this embodiment includes a dispenser (not shown) for dispensing food product 14. Food product 14, for example, waffle fries, are dispensed into a basket 16 from the dispenser of the dispensing freezer 18, cooked in the fryer 12, and then transferred from the fryer 12 to the hot holding station 20 via the baskets 16, as discussed in greater detail below. While a basket 16 is shown and described, it is appreciated that other moveable food product receptacles are also envisioned.

The hot holding station 20 of the embodiment shown in FIG. 1 receives cooked food product 14 from the basket 16 of the fryer 12, to thereby enable operator manipulation and packaging to finalize preparation of the food products for delivery to fulfill customer demands, as well understood in the restaurant field. The hot holding station 20 is of conventional design and is briefly described as follows: it includes a hot holding cabinet 28 and a hot holding receiving area 30. As shown, the hot holding cabinet 28 may include a plurality of vertical slots 32 or angled corrugated slots 34 to hold the now cooked food product 14. For example, the hot holding receiving area 30 may include an angled front portion 36, and a plurality of apertures 38 to enable circulating air flow to help the cooked food product 14 remain in a desirable state. Receptacles 40 for holding packaging to load food products into may be located in the front of the hot holding receiving area 30. Since the throughput of this automated cooking system 10 exceeds current systems, the hot holding receiving area 30 is generally larger to enable one or more workers to package the cooked food product 14 and keep up with the throughput of the automated cooking system 10. It will be understood that other types of hot holding 20 and preparation stations may be used with the fryer 12 in other embodiments. For example, an automated holding and packaging station may be later developed and combined with the features of the automated cooking system 10 described in detail below, without departing from the scope of this disclosure.

Interfacing with a touch-screen control (not shown) or the like according to an embodiment, the operator selects the quantity of food product 14 and the repeating rate upon which they wish to cook, and the automated cooking system 10 automatically optimizes the dispensing schedule from the freezer 18 and where to perform the cooking within the fryer 12. It will be understood that the food products to be cooked and the production rate may also be communicated to the cooking system 10 by other methods, including wireless communication from order management computer(s) that receive customer demands for food product and facilitate restaurant employees with fulfilling customer demands and orders accordingly. Regardless of how the control parameters are set, the automated cooking system 10 generally operates as follows: it automatically raises the predetermined basket 16, moves the basket 16 to the position to accept the uncooked food product 14, moves the basket 16 to the proper cooking chamber, e.g., fryer vat 42, location, lowers the basket 16 into the cooking medium 44, raises the basket 16 once cooked and moves the basket 16 to be dispensed into the hot holding receiving area 30, and then moves the basket 16 back to a predetermined location at the fryer 12 or back to the freezer 18 to accept more uncooked food product 14.

In an embodiment, the system controller 25 of the automated cooking system 10 may be configured to implement different modes of the system 10 or fryer 12. In any event, the system controller 25 may be operatively coupled to a dispensing mechanism of the dispensing freezer 18 to enable coordination between the dispensing of uncooked food product 14 from the dispensing freezer 18 into the basket 16, such that a predetermined amount of food product 14 is dispensed into the basket 16. The system controller 25 may also interface with other equipment in a fully automated fashion, to cause cooking of food product 14 in response to customer orders or demand. To this end, while the system controller 25 is referred to separately from the gantry control 26 previously described and shown in FIG. 1, it will be appreciated that the gantry control 26 may be an integral part of a single system controller 25 operating all elements of the cooking system 10 without departing from the scope of this invention.

Also initially shown in FIG. 1, the fryer 12 also includes a gantry system 22 that is configured to move a basket 16 between a plurality of positions at the fryer 12. The gantry system 22 includes a gantry 24. The gantry 24 is moved by the gantry system 22 using a motor (not shown) which is controlled using a gantry control 26 enabling the gantry 24 to move to a desired position. The gantry control 26 interfaces with or is part of a system controller 25 (schematically shown in FIG. 1), which is described in greater detail below. The gantry system 22 is configured to service each platform 46 associated with each fryer vat 42 with a basket 16. The operation of the gantry system 22 and how it helps the cooking system 10 achieve higher food product throughput is described in further detail below.

FIG. 2 shows an exemplary embodiment of the fryer 12 used in the automatic cooking system 10. The system 10 includes a frame 50 mounted on a plurality of casters or wheels 52, so that the fryer 12 may be easily moveable on a surface, such as a floor. In one embodiment, one or more of the wheels 52 are lockable to prevent unwanted movement of the fryer 12 during operation. In a further embodiment, the frame 50 includes feet 54 so that the frame 50 of the system 10 is not placed directly onto a surface, such as a floor. In one embodiment, the feet 54 are adjustable such that the system 10 can be raised or lowered to a desired height above a surface, such as a floor. Alternatively, the wheels 52 or feet 54 may be eliminated if desired. A plurality of wall panels 56 are provided on the frame 50 to strengthen the frame 50. Various fryer 12 components such as, for example, oil filtration and recirculation components, may be supported by or housed by the frame 50 within the wall panels 56. These components are of a conventional design, and thus, are not shown in detail in the figures. Cabinets 58 may be located near the bottom of the fryer 12 and may be used to remove already-used cooking medium 44. According to another embodiment, cabinets 58 may be used as storage for unused cooking medium 44 or other products.

With continued reference to FIG. 2, in an embodiment, the fryer 12 includes five fryer vats 42, each configured to hold a cooking medium 44. As shown, each fryer vat 42 is configured to hold at least one basket 16. However, more or fewer fryer vats 42 are also envisioned, with each fryer vat 42 being configured to hold one or more baskets 16. For example, the fryer 12 may feature three fryer vats 42 wherein each fryer vat 42 is configured to accommodate two platforms 46 (and thus two cooking baskets 16) each, for a total of six platforms 46 and six baskets 16. At least one heating element 48 is disposed within each fryer vat 42. However, it is envisioned that each fryer vat 42 may include any suitable number of heating elements 48 in any arrangement, as may be desired. The heating element 48 is configured to heat the cooking medium 44 to a predetermined temperature so as to cook the food products 14 therein. Further, in an embodiment the fryer 12 includes vertical transport assemblies 60, which are configured to raise and lower the baskets 16 into and out of the fryer vats 42 on platforms 46 attached to the vertical transport assemblies 60. It is envisioned that each fryer vat 42 may contain a single basket 16, which is movable on a platform 46 of one of the vertical transport assemblies 60. Alternatively, a fryer vat 42 may accommodate two or more baskets 16, each moveable on a separate platform 46 on a separate vertical transport assembly 60. It is also envisioned that a basket 16 may be used with different fryer vats 42 or different platforms 46 of the vertical transport assemblies 60. Mounted in the rear of the frame 50 are the motors and other corresponding components (not shown) for each of the vertical transport assemblies 60.

Figure 3A:
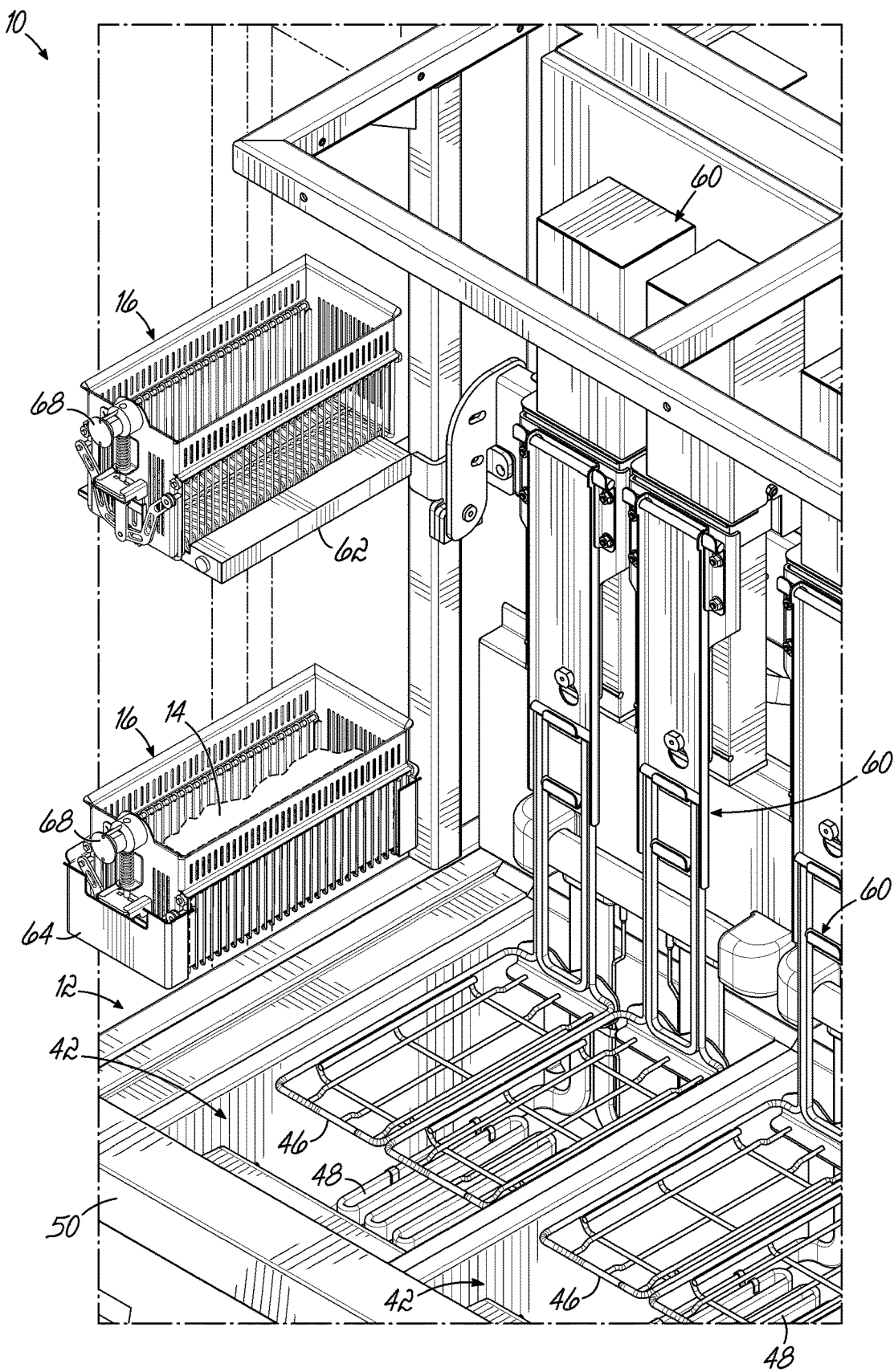
FIG. 3A is an enlarged front perspective detail view of a portion of the fryer of FIG. 2, showing an empty basket located on a staging shelf of a dispensing freezer positioned adjacent the fryer and a basket filled with food product located in a basket movement receptacle.

With reference to FIGS. 3A-3D, these Figures show elements of the cooking system 10 and operational steps taken at the adjacent stations to the fryer 12, as initially introduced above. Referring first to FIG. 3A, the Figure shows a portion of the fryer 12 adjacent the dispensing freezer 18. At the dispensing freezer 18, a staging shelf 62 is shown in a deployed position and supporting an empty basket 16. In the deployed position, the staging shelf 62 is in a generally horizontal orientation such that a basket 16 can be placed on the staging shelf 62 by the gantry 24. When not supporting a basket 16, the staging shelf 62 can alternatively be in a stowed position. In the stowed position, the staging shelf 62 is generally vertical such that the staging shelf 62 cannot support a basket 16. In an embodiment, the state of the staging shelf 62 (e.g., in the deployed or stowed position) is determined by the system controller 25 in communication with the gantry control 26. FIG. 3A also shows a basket 16 filled with uncooked food product 14 located in a basket movement receptacle 64. The basket movement receptacle 64 of this embodiment defines a generally U-shaped support surrounding an open slot facing generally towards the staging shelf 62. In FIG. 3A, the basket movement receptacle 64 is located in a pickup position and is waiting for the gantry control 26 to direct the gantry system 22 to move the gantry 24 to the location of the basket movement receptacle 64, in the pickup position, to pick up a basket 16. The gantry 24 will move the basket 16 filled with uncooked food product 14 from the basket movement receptacle 64, in the pickup position, to one of the empty platforms 46 at the fryer 12 in preparation for the food product 14 to be cooked by the cooking medium 44 in the corresponding fryer vat 42.

Figure 3B:
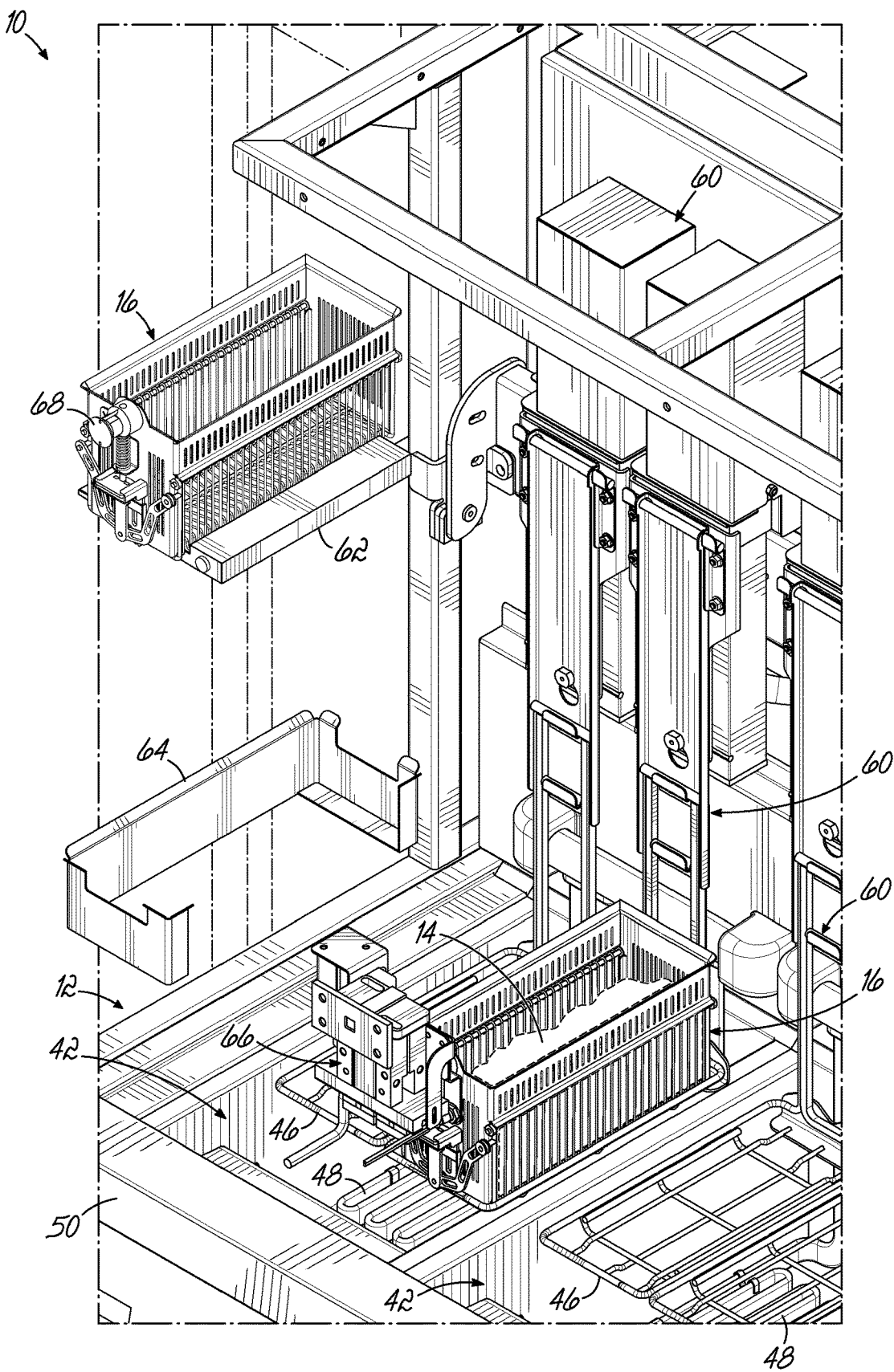
FIG. 3B is a front perspective detail view similar to FIG. 3A, showing the filled basket moved from the basket movement receptacle to a platform of a vertical transport assembly above a fryer vat by a gantry of the automated gantry system.

FIG. 3B shows the basket 16 of FIG. 3A, still filled with uncooked food product 14, moved from the basket movement receptacle 64 (in the pickup position) to the available platform 46 above the fryer vat 42 via the gantry 24. Specifically, a clamping gripper 66 of the gantry 24 engages with a single pickup point 68 on the basket 16 to permit the gantry 24 to move the basket 16 from location to location. The engagement of the gantry 24 with a basket 16 is described in further detail below with reference to FIGS. 5A and 5B.

Figure 3C:
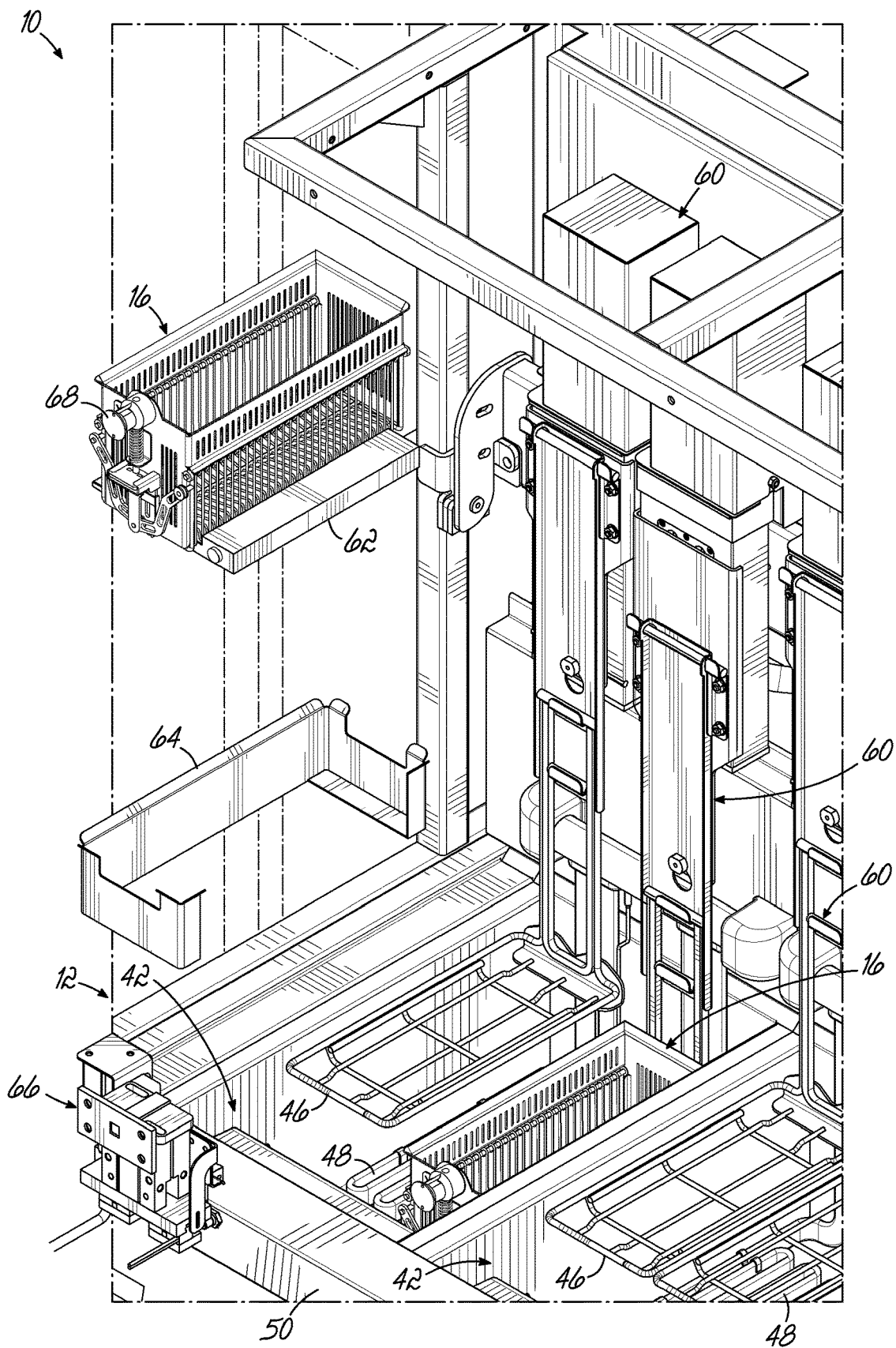
FIG. 3C is a front perspective detail view similar to FIG. 3B, showing the filled basket of FIG. 3A lowered into the fryer vat by the vertical transport assembly.

FIG. 3C shows the basket 16 of FIG. 3B, previously located on the platform 46 above the fryer vat 42 and filled with uncooked food product 14, being submerged into the cooking medium 44 of the fryer vat 42 by the vertical transport assembly 60. In this regard, each platform 46 above a fryer vat 42 is attached to a vertical transport assembly 60 such that the vertical transport assembly 60, upon receiving a signal from the system controller 25, can lower the basket 16 with uncooked food product 14 into the fryer vat 42. After a predetermined or specified amount of cooking time, the vertical transport assembly 60, upon receiving a signal from the system controller 25, lifts the platform 46 and the basket 16 sitting thereon from the fryer vat 42. Through this process, the uncooked food product 14 in the basket 16 becomes cooked food product 14.

Also shown in FIG. 3C is the empty basket movement receptacle 64, following removal of the basket 16 by the gantry 24. The U-shaped support configuration is clearly visible in this Figure. The front and rear sides of the basket movement receptacle 64 in this embodiment include ledges that engage with the front and back ends of a basket 16 during support of the basket 16 in the basket movement receptacle 64. The gap between these ledges defines the open slot that is large enough to pass by the staging shelf 62 during movement of the basket movement receptacle 64. The basket movement receptacle 64 can thus freely translate upwardly and downwardly past the staging shelf 62 regardless of the position the staging shelf 62 is in, which also allows for pickup of a basket 16 from the staging shelf 62 to then support that same basket on the basket movement receptacle 64. Alternative constructions of the basket movement receptacle 64 are possible in other embodiments, so long as a transfer between the staging shelf 62 and the basket movement receptacle 64 continues to be enabled for the basket workflow process steps described herein.

After the gantry 24 transports a filled basket 16 from the basket movement receptacle 64 to a platform 46, the basket movement receptacle 64, upon receiving a signal from the system controller 25, then receives a basket 16 from the staging shelf 62. As described above, the basket movement receptacle 64 is shaped such that the staging shelf 62 can fit within the open slot of the generally U-shaped basket movement receptacle 64. In order to transfer a basket 16 from the staging shelf 62 to the basket movement receptacle 64, the basket movement receptacle 64 moves up to the position of the staging shelf 62. In an embodiment, the basket 16 is transferred from the staging shelf 62 to the basket movement receptacle 64 by the basket movement receptacle 64 being positioned against the basket 16 and then, the staging shelf 62 pivoting from a deployed position to a stowed position. In this embodiment, the basket 16 is securely positioned in the basket movement receptacle 64 before the staging shelf 62 changes positions. In an alternative embodiment, the basket 16 is transferred from the staging shelf 62 to the basket movement receptacle 64 by the basket movement receptacle 64 being positioned slightly below the location of the basket 16 and then, the staging shelf 62 pivoting from a deployed position to a stowed position. In this embodiment, the basket 16 drops with movement of the staging shelf 62 a short distance from the staging shelf 62 and into the basket movement receptacle 64. The basket movement receptacle 64 is generally adjacent to the staging shelf 62 whenever a transfer of the basket 16 occurs in accordance with these embodiments.

The basket movement receptacle 64 then moves the unfilled basket 16 to a filling position (not shown in detail in FIG. 3C as this position may vary depending on where the outlet(s) of the freezer 18 are located relative to the fryer 12) where the dispensing freezer 18 dispenses uncooked food product 14 into the basket 16. In an embodiment, the filling position may vary depending upon the type of food product 14 being dispensed by the dispensing freezer 18. For example, the dispensing freezer 18 may dispense one uncooked food product 14 at one position and a different uncooked food product 14 at a second position. After the basket 16 is filled at the filling location, the basket movement receptacle 64 then moves the basket 16 to a pickup position as previously shown in FIG. 3A, where the basket 16 will wait to be picked up by the gantry 24 and moved to a platform 46 in preparation for a cooking cycle. In some embodiments, the filling location and pickup position may be different positions. For example, the basket 16 may be filled at one location and picked up in different location. In other embodiments, the filling location and the pickup position may be the same physical location. For example, the dispensing freezer 18 may fill a basket 16 at a filling location and then the basket 16 may remain in that position until the basket 16 is picked up by the gantry 24 and taken to a platform 46.

Accordingly, the portions of the cooking system 10 on this end of the fryer 12 enable coordinated movement and actions to be performed with baskets 16 at/adjacent the dispensing freezer 18 while the gantry 24 works at other portions of the cooking system 10. To this end, the gantry 24 does not need to manage movement of a basket 16 between filling and holding positions during a filling step, and this simplifies the operation and movement needed by the gantry 24 along this end of the fryer 12. For example, the gantry 24 only needs to be able to move to the designated drop off point at the staging shelf 62 and to the pickup point at the lowered position of the basket movement receptacle 64 shown in FIG. 3A. Moreover, the gantry 24 can drop off an empty basket 16 at the staging shelf 62 and then immediately go pick up a filled basket 16 at the basket movement receptacle 64 without delay such that the gantry 24 can more rapidly move to the next basket 16 that needs workflow movements at the cooking system 10. Put another way, the staging shelf 62 and the basket movement receptacle 64 automatically handle movement and filling of a basket 16 while the gantry 24 moves to the fryer 12 and to the hot holding station 20, thereby avoiding the need for the gantry 24 to manage these steps. These concurrent actions improve the workflow control of baskets 16 at the cooking system 10 and thereby help enable the higher food product cooking throughput achieved by this invention.

Figure 3D:
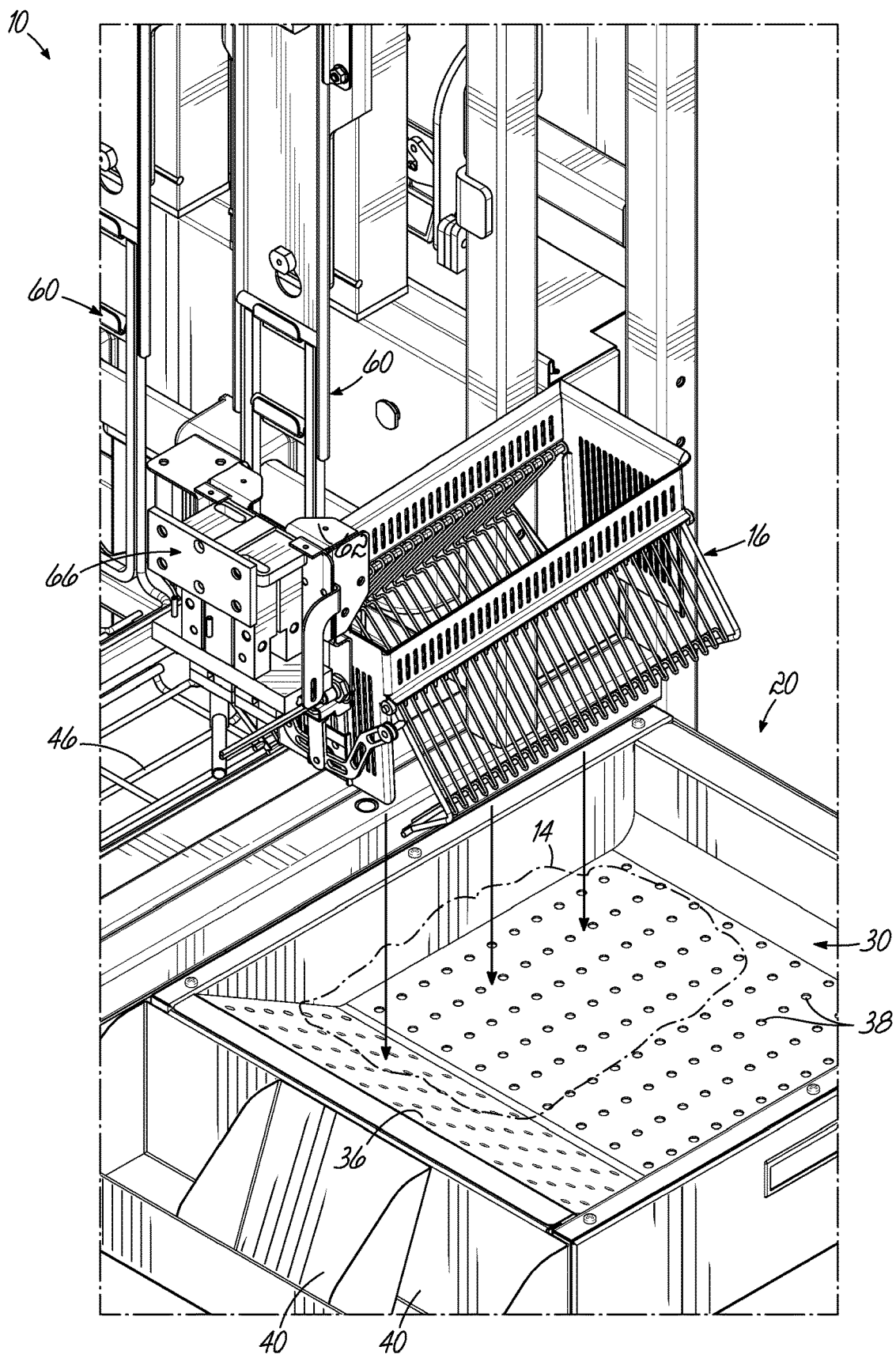
FIG. 3D is an enlarged front perspective detail view of another portion of the fryer of FIG. 2, showing the gantry engaged with a basket filled with cooked food product after emerging from the fryer vat, and showing the gantry actuating discharging of the cooked food product from the filled basket into a hot holding station adjacent the fryer.

FIG. 3D shows a portion of the fryer 12 along an opposite end of that shown in FIGS. 3A-3C and the hot holding station 20 adjacent this opposite end of the fryer 12. The gantry 24, at the direction of the gantry control 26, has engaged a basket 16 filled with cooked food product 14 (via the clamping gripper 66 of the gantry 24 and the single pickup point 68 of the basket 16, as more fully explained below in reference to FIGS. 5A and 5B) and brought the basket 16 to a position at a designated height above the hot holding station 20. The gantry 24, upon receiving a signal from the gantry control 26, actuates the basket 16 so that the basket 16 opens along a bottom thereof to discharge the cooked food product 14 into the hot holding receiving area 30. The particular height above the hot holding station 20 at which the gantry 24 discharges the cooked food product 14 from the basket 16 can vary depending upon the particular cooked food product 14. For example, one cooked food product 14 may be discharged from one height above the hot holding station 20, while a different cooked food product 14 may be discharged from a different height above the hot holding station 20 (e.g., more fragile cooked food product 14 may be dropped from a basket 16 at a lower height above the hot holding receiving area 30 than other cooked food products 14, such differences being programmed into the gantry control 26 based on what types of food product are to be cooked and prepared at the cooking system 10). It will be understood that the hot holding receiving area 30 may be subdivided in some embodiments and the gantry 24 is able to discharge cooked food product from baskets 16 into any of these subdivided areas.

Figure 4A:
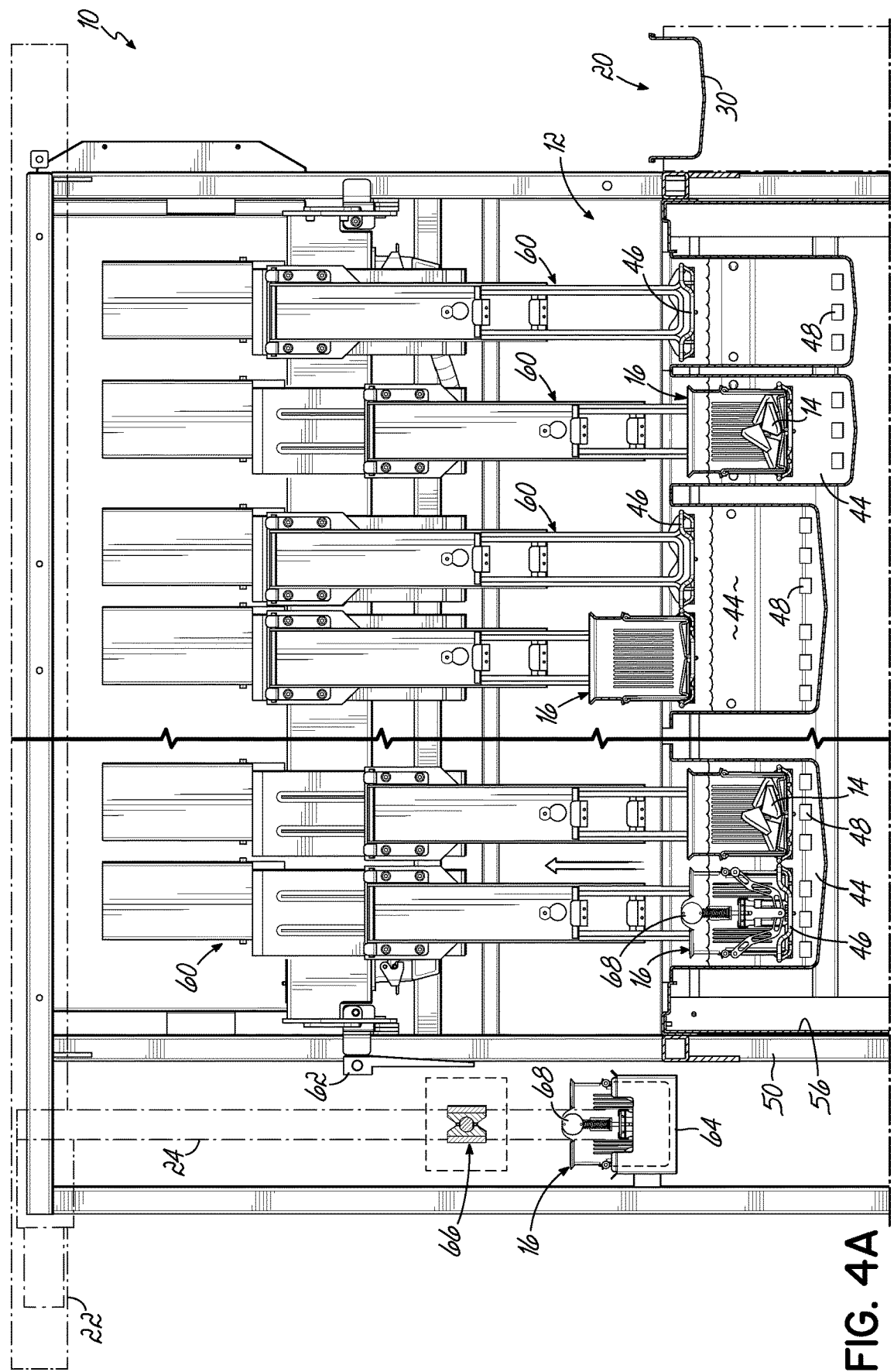
FIG. 4A is a front (partially cross-sectioned) view of a fryer similar to the one shown in FIG. 2, and more particularly showing a plurality of baskets on platforms at various stages of a cooking cycle, an exemplary process of which is shown in this series of Figures.

Referring now to FIGS. 4A-4H, these Figures show a series of steps defining a basket loading cycle and a basket discharge cycle according to embodiments of this invention, each of which may be repeatedly performed to manage basket workflow at the cooking system 10. Referring to FIG. 4A, the Figure shows portions of a basket loading cycle in accordance with one embodiment. The basket loading cycle begins with an empty basket 16 sitting on one of the platforms 46 positioned over a center one of the fryer vats 42. The empty basket 16 is waiting to be picked up by the gantry 24, which is shown positioned over by the dispensing freezer 18 in this state of FIG. 4A. When the gantry 24 receives a signal from the gantry control 26, the gantry 24 will move laterally to the platform 46 holding the empty basket 16 so as to engage the empty basket 16. Further, FIG. 4A shows in a leftmost one of the fryer vats 42 two baskets 16 filled with recently cooked food product 14 emerging from the cooking medium 44 in a fryer vat 42. The vertical transport assemblies 60 lift the platforms 46 on which the baskets 16 sit, thus raising the baskets 16 from the fryer vats 42 and out of the heated cooking medium 44 at the end of a cooking cycle, as shown by the upward arrow in FIG. 4A.

Figure 4B:
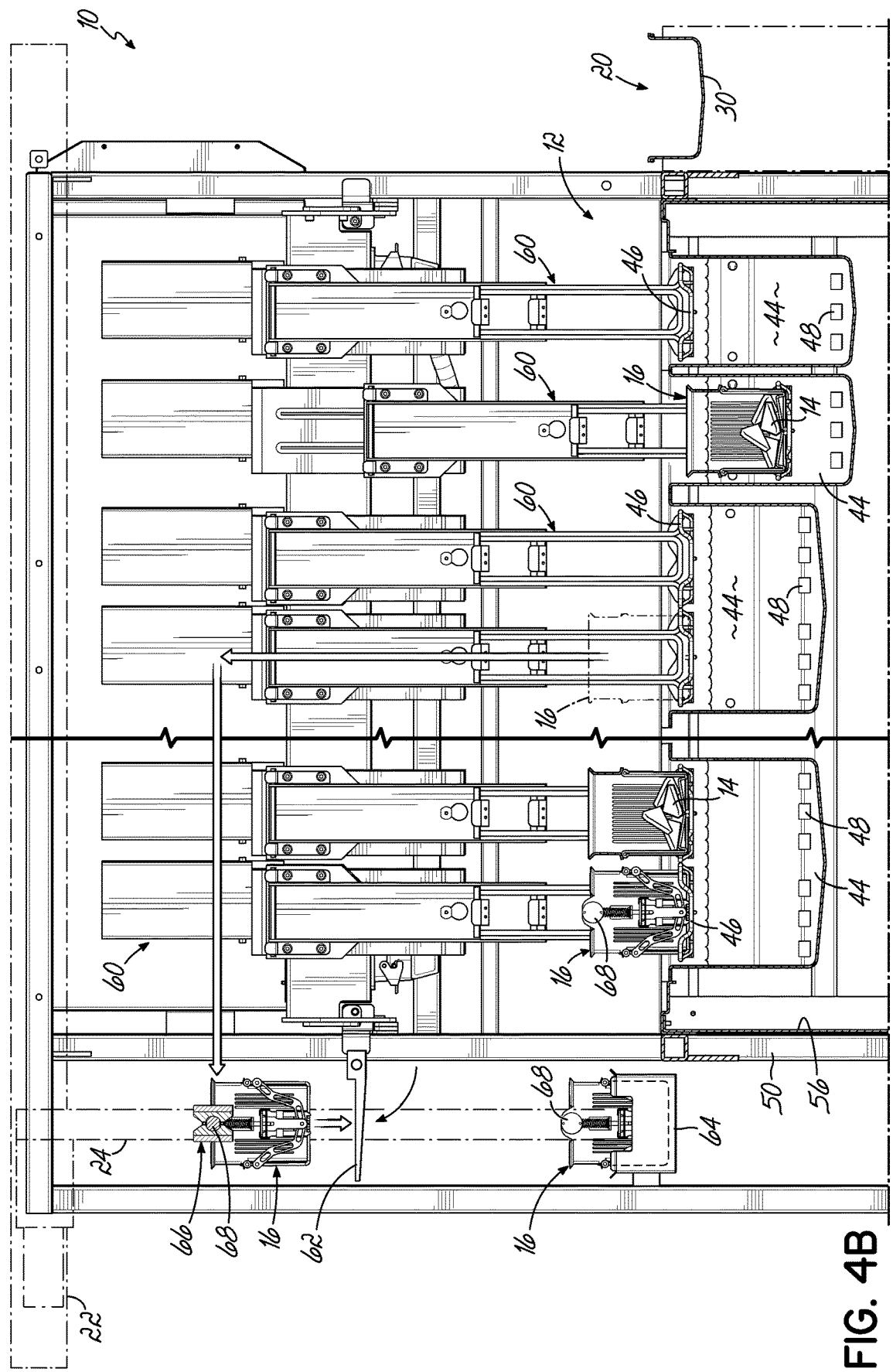
FIG. 4B is a front view similar to FIG. 4A, showing a further step of the exemplary process for managing basket workflow using the automated cooking system.

FIG. 4B shows the gantry 24, after receiving a signal from the gantry control 26, engaging the empty basket 16 on the platform 46 and moving that basket 16 as shown by the upward and leftward movement arrows in FIG. 4B from the platform 46 to the staging shelf 62 adjacent the dispensing freezer 18. Sometime before the empty basket 16 arrives at the staging shelf 62, the system controller 25 sends a signal to the staging shelf 62 so that the staging shelf 62 pivots into a (generally horizontal) deployed position if the staging shelf 62 was previously in a stowed position. With the staging shelf 62 in the deployed position, the gantry 24 places the empty basket 16 on the staging shelf 62 by lowering the basket 16 onto the staging shelf 62 and then disengaging from the basket 16. The mechanics of engagement and disengagement between the gantry 24 and a basket 16 are further explained below with respect to FIGS. 5A and 5B.

Figure 4C:
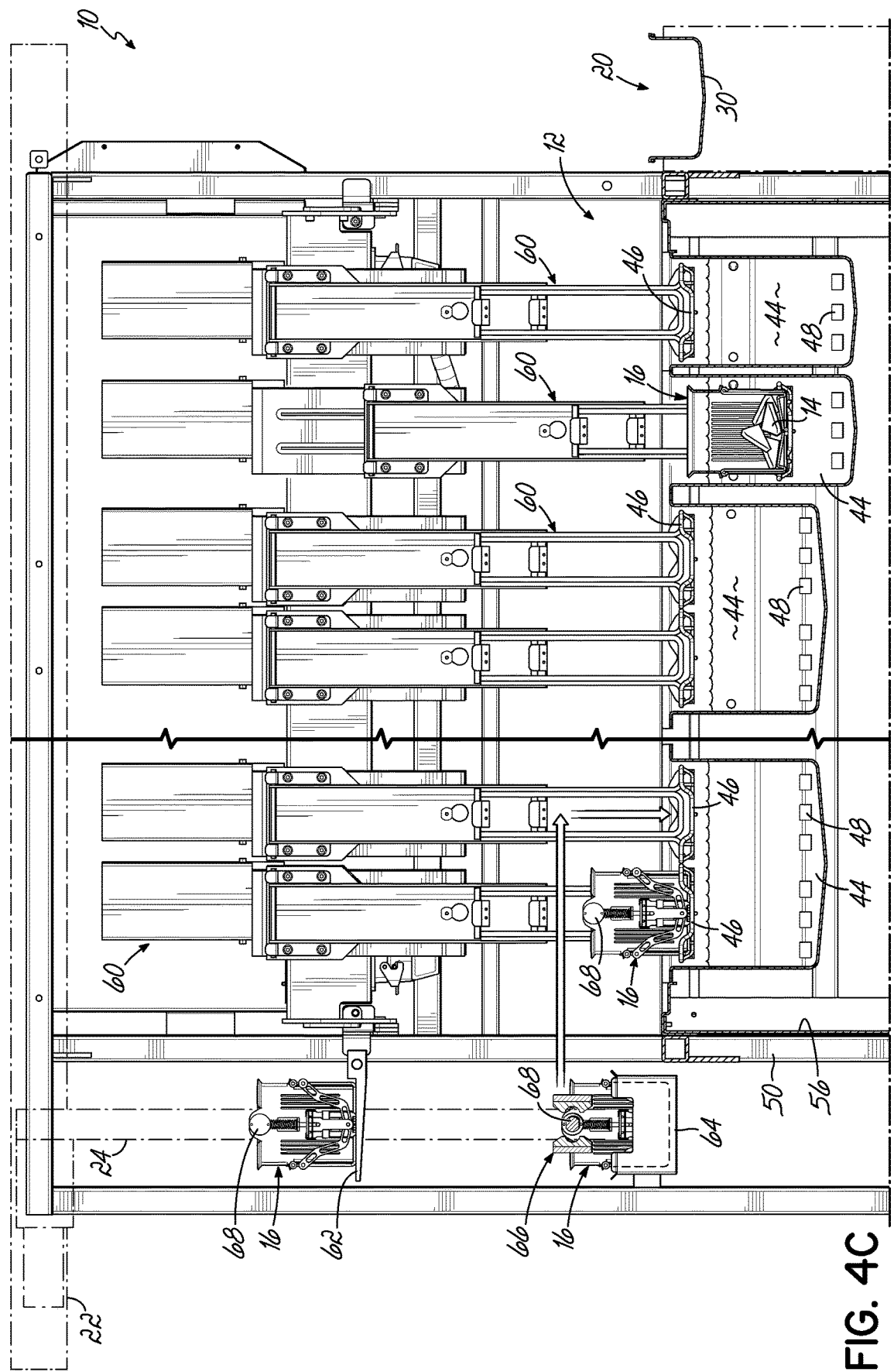
FIG. 4C is a front view similar to FIG. 4B, showing another step of the exemplary process for managing basket workflow using the automated cooking system.

FIG. 4C shows a basket 16 filled with uncooked food product 14 in the basket movement receptacle 64, located in a pickup position adjacent the dispensing freezer 18, being engaged by the gantry 24. To this end, after dropping off the empty basket 16 onto the staging shelf 62, the gantry 24 moves downwardly to the basket movement receptacle 64. After a basket 16 has been filled by the dispensing freezer 18 at a filling location, the basket movement receptacle 64 moves (if necessary) the basket 16 into a pickup position such that the basket 16 is ready to be engaged by the gantry 24 as shown in FIG. 4C. The gantry 24, after receiving a signal from the gantry control 26, engages with the filled basket 16 and moves the basket 16 to an open platform 46 above a fryer vat 42, as shown by the rightward and downward movement arrows in FIG. 4C. Which platform 46 the basket 16 should be moved to is typically determined by the system controller 25. Once the gantry 24 has placed a basket 16 on an open platform 46, the gantry 24 disengages with the basket 16 and leaves the basket 16 on the platform 46 above the fryer vat 42. Note that although a filled basket 16 was previously shown in FIG. 4B at this platform 46 where the gantry 24 drops off the new basket of food to be cooked in FIG. 4C, this prior basket is understood to have been separately moved and discharged at the hot holding station 20 before the step shown in FIG. 4C (as set forth in the description of basket discharge cycles below), or the filled basket 16 from the basket movement receptacle 64 is moved to a different, open/empty platform 46 during the basket loading cycle. The drop-off of the filled basket 16 onto the platform 46 completes the basket loading cycle of this embodiment.

Figure 4D:
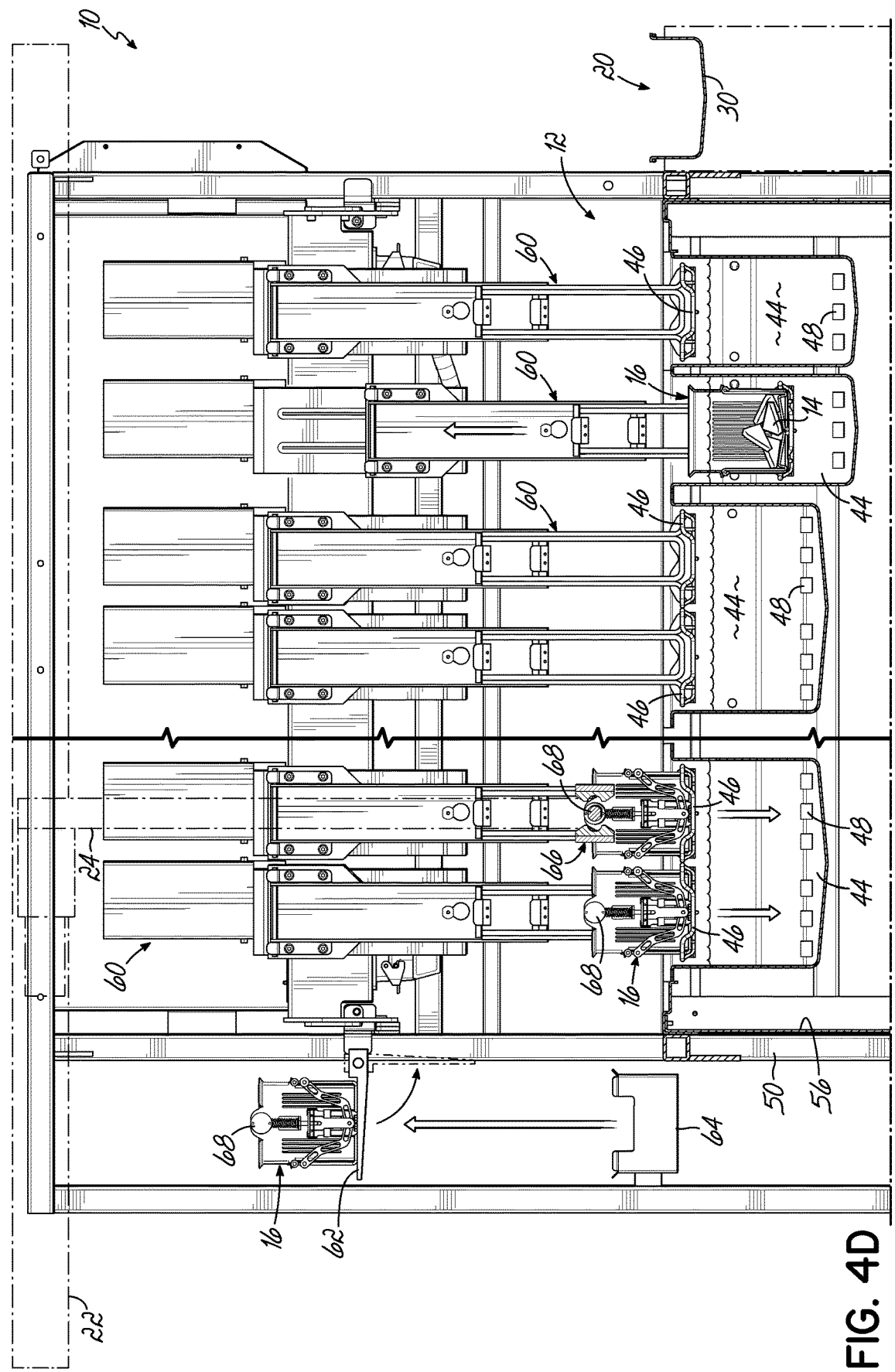
FIG. 4D is a front view similar to FIG. 4C, showing yet another step of the exemplary process for managing basket workflow using the automated cooking system.

FIG. 4D shows the basket movement receptacle 64 moving upwards as shown by the arrow towards the staging shelf 62 in order to transfer the empty basket 16 on the staging shelf 62 from the staging shelf 62 to the basket movement receptacle 64. As described above, the staging shelf 62 can be pivoted to the generally vertical stowed position to complete the transfer of the basket 16 into the basket movement receptacle 64 as shown. Further, FIG. 4D shows baskets 16 filled with uncooked food product 14 on platforms 46 above a fryer vat 42 being lowered into a cooking medium 44 for a cooking cycle via the vertical transport assemblies 60. The platforms 46, on which the baskets 16 sit, are attached to the vertical transport assemblies 60 which move the baskets 16 into and out of the cooking medium 44 in the fryer vats 42 upon receiving a signal to initiate a cooking cycle from the system controller 25. These actions can automatically occur at the cooking system 10 while the gantry 24 moves to perform actions on other baskets and platforms, such as in the exemplary basket discharge cycle to now be described.

Figure 4E:
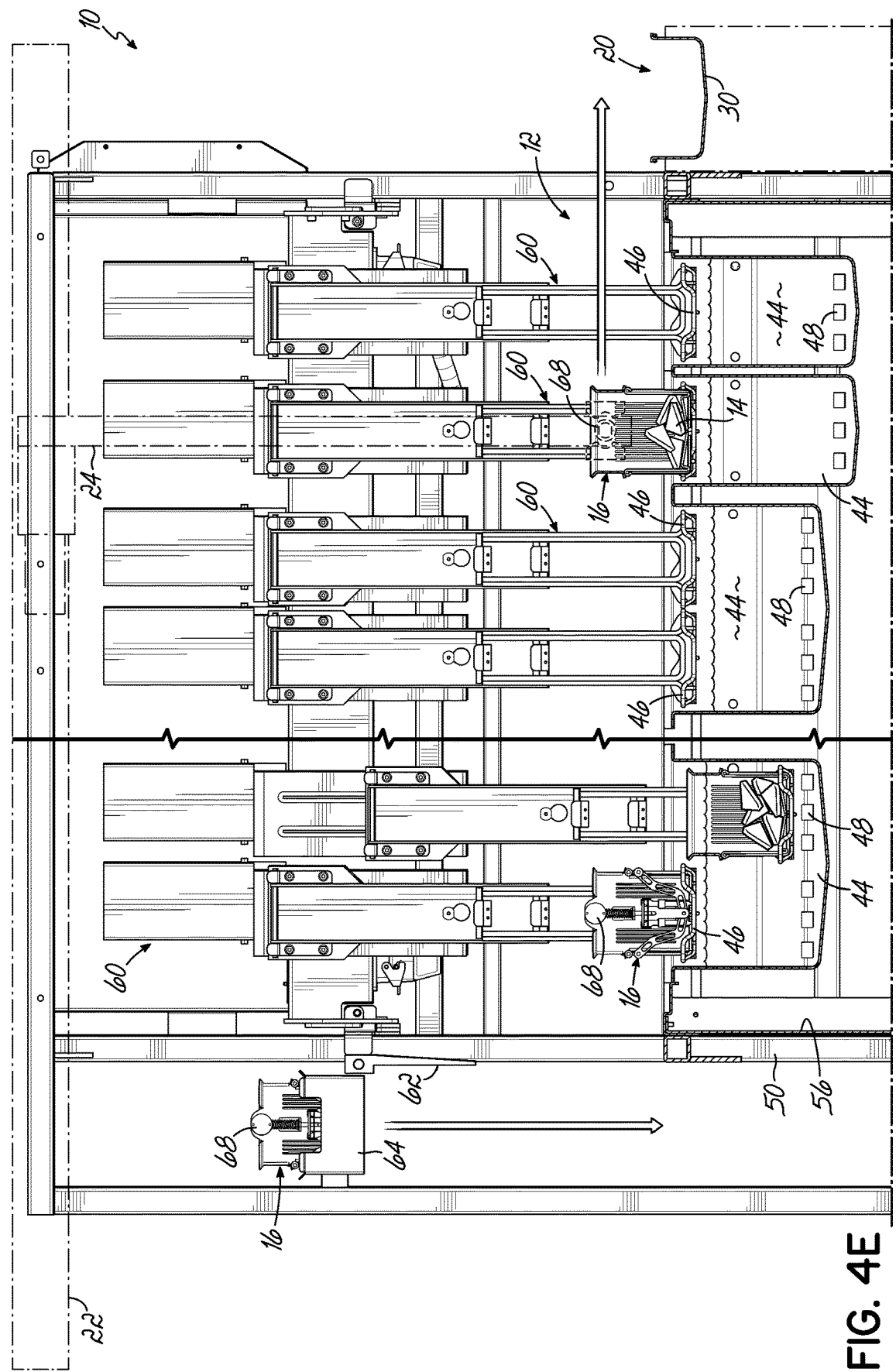
FIG. 4E is a front view similar to FIG. 4D, showing a further step of the exemplary process for managing basket workflow using the automated cooking system.

FIG. 4E shows a basket 16 in the basket movement receptacle 64 being transported. The staging shelf 62 has been pivoted to the vertical, stowed position as shown. The basket movement receptacle 64 transports the basket 16 to a filling location. At the filling the location, the dispenser freezer 18 dispenses uncooked food product 14 into the basket 16. The basket movement receptacle 64 then transports the basket 16 from the filling location to the pickup position, if these positions are different from one another. In an embodiment, the filling location and the pickup position may be distinct physical locations. In a further embodiment, the filling location and the pickup position may be the same physical location. Regardless of how the basket movement receptacle 64 may move to and from the filling location, the end result is filling of the basket 16 and movement from the initial drop-off position on the staging shelf 62 downwardly as shown by the arrow in FIG. 4E to the pickup position that is accessed by the gantry 24 in a future basket loading cycle. Once in the pickup position, the filled basket 16 waits in the basket movement receptacle 64 until the basket 16 is engaged by the gantry 24. These movements can occur simultaneous to other actions being taken by the gantry 24 at the fryer 12.

For example, FIG. 4E also shows a basket 16 with cooked food product 14 (after exiting a fryer vat 42) being moved from a platform 46 above the fryer vat 42 to a position above the hot holding station 20 via the gantry 24. This movement is shown by the rightward arrow in FIG. 4E, resulting in the positioning of the basket 16 and the gantry 24 shown in FIG. 4F and described below. This pickup and movement of the filled basket 16 is the beginning of an exemplary basket discharge cycle that is repeatedly performed by the gantry 24 in this embodiment.

Figure 4F:
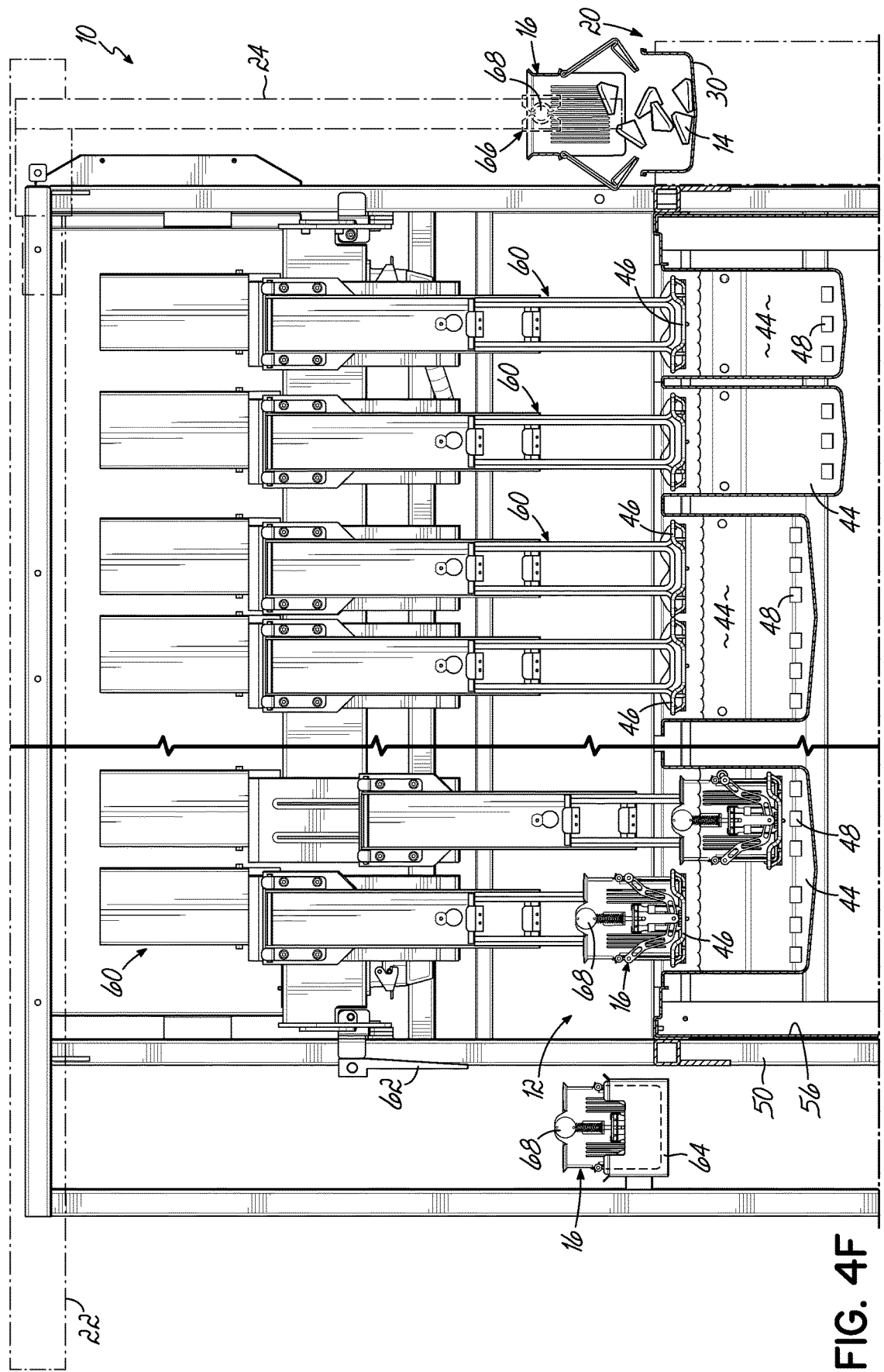
FIG. 4F is a front view similar to FIG. 4E, showing another step of the exemplary process for managing basket workflow using the automated cooking system.

FIG. 4F shows the basket 16 filled with cooked food product 14 suspended by the gantry 24 in a position at a height above the hot holding station 20. Further, FIG. 4F shows the gantry 24, upon receiving a signal from the gantry control 26, actuating the filled basket 16 to open the bottom of same and thereby discharge the cooked food product 14 into the hot holding receiving area 30 of the hot holding station 20. As set forth above, the gantry 24 can vary the height above the hot holding station 20 at which this discharge step occurs depending on the specific type of food product contained within the basket 16. The cooked food is then held in the hot holding receiving area 30 for further preparation and packaging by an operator.

Figure 4G:
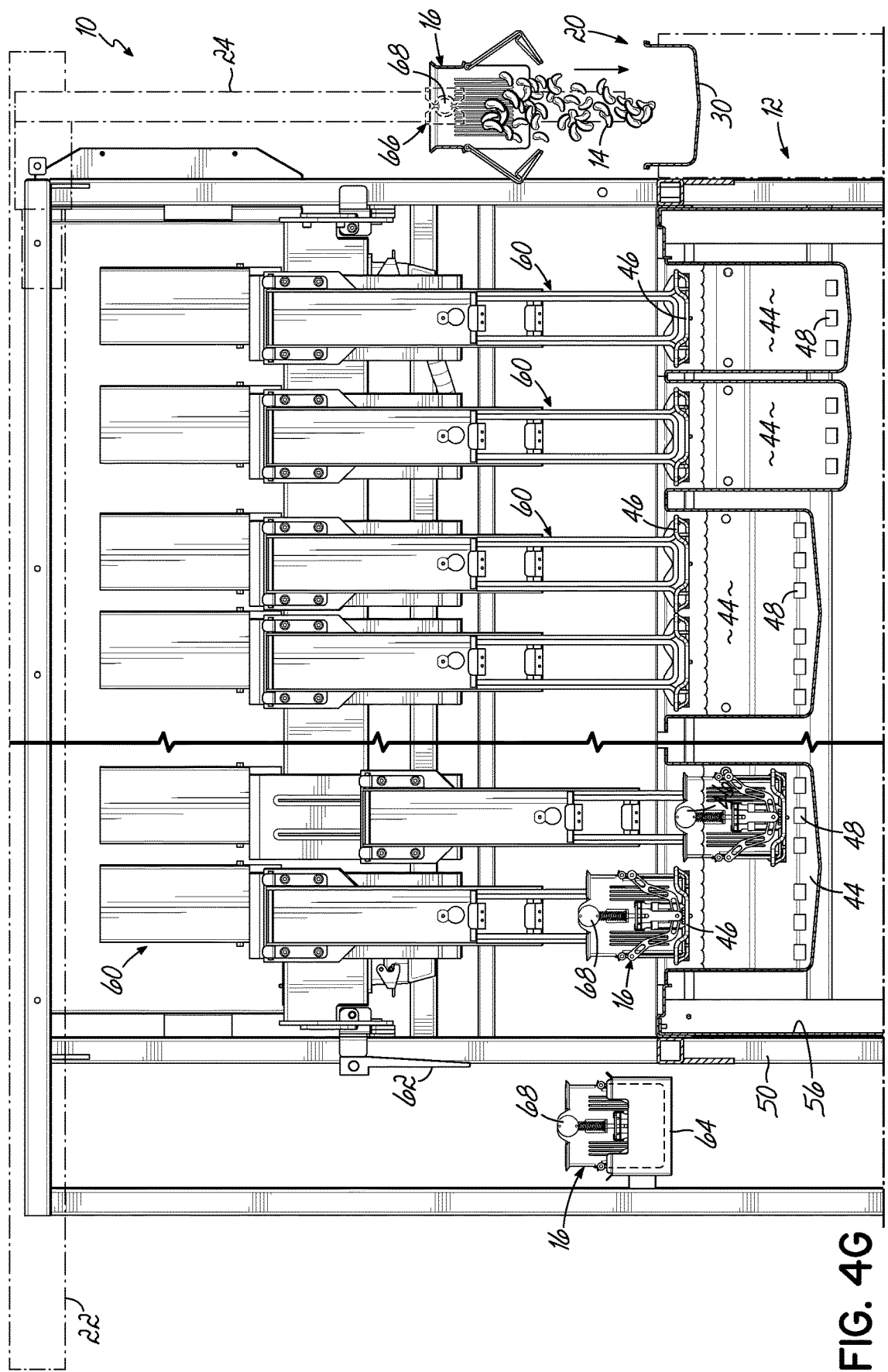
FIG. 4G is a front view similar to FIG. 4F, showing yet another step of the exemplary process for managing basket workflow using the automated cooking system.

FIG. 4G shows, like in FIG. 4F, a basket 16 filled with cooked food product 14 suspended in a position at a height above the hot holding station 20 by the gantry 24. However, the basket 16 from which the cooked food product 14 is being discharged in FIG. 4G is positioned at a different height than the basket 16 from which the cooked food product 14 is being discharged in FIG. 4F. Depending upon the particular food product 14 being discharged, the basket 16 from which the cooked food product 14 is discharged may be positioned above the hot holding station 20 at different heights. For example, one cooked food product 14 may be discharged at a first height while a different cooked food product 14 may be discharged at a different, second height either higher or lower than the first height.

Figure 4H:
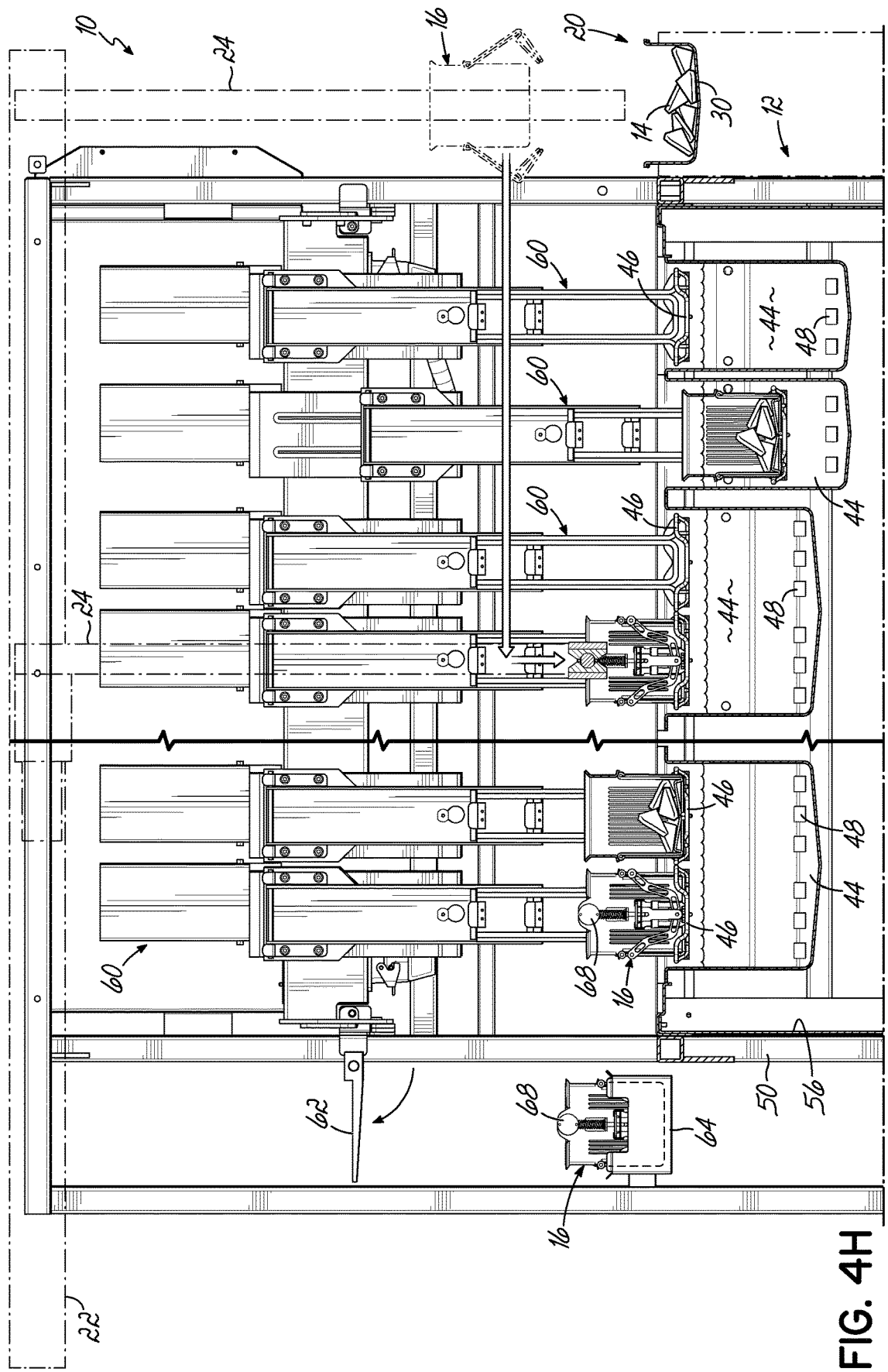
FIG. 4H is a front view similar to FIG. 4G, showing a further step of the exemplary process for managing basket workflow using the automated cooking system.

FIG. 4H shows the gantry 24, at the direction of the gantry control 26, transporting the basket 16 from a position above the hot holding station 20 (after discharging cooked food product 14) to an open platform 46 above one of the fryer vats 42. The gantry 24 disengages with the basket 16 and leaves the basket 16 on a platform 46 above a fryer vat 42, which completes the basket discharge cycle of this embodiment. The empty basket 16 is then ready to be engaged by the gantry 24 again when customer demand necessitates. It will be understood that the gantry 24 could omit this drop-off step in other embodiments and instead take the empty basket 16 directly to the staging shelf 62 to begin another basket loading cycle. Further, FIG. 4H shows the staging shelf 62 pivoting from a vertical, stowed position to a horizontal, deployed position in preparation for any empty basket 16 to be placed upon the staging shelf 62 by the gantry 24. The gantry 24 can then move again to start a new basket loading cycle, a new basket discharge cycle, or to the basket movement receptacle 64 as specifically shown in FIG. 4H.

Generally, FIGS. 4A-4H show features of the system's 10 basket loading and discharge cycles for managing basket 16 workflow during food preparation at an automated cooking system 10. The automated cooking system 10 prioritizes and orders the basket loading cycles and basket discharge cycles for the gantry system 22 to satisfy varying levels of demand for cooked food product 14 from the automated cooking system 10. A basket loading cycle, as performed by the gantry system 22, includes in one embodiment: the gantry 24 picking up an empty basket 16 from a platform 46, transporting the empty basket 16 to the dispensing freezer 18 to be filled with uncooked food product 14, picking up a basket 16 filled with uncooked food product 14 from the dispensing freezer 18, and transporting the filled basket 16 from the dispensing freezer 18 to a selected platform 46 above a fryer vat 42 (as determined by the gantry control 26) to be cooked in the fryer vat 42. In such an embodiment, the basket loading cycle can be completed in a time period of less than 20 seconds. The exemplary embodiment shown performs a basket loading cycle as described here in about 18 seconds, for example. A basket discharge cycle, as performed by the gantry system 22, includes in one embodiment: the gantry 24 picking up a filled basket 16 containing cooked food product 14 from a platform 46, transporting the filled basket 16 to a position above the hot holding station 20, the gantry 24 actuating the basket 16 to discharge the cooked food product 14 therein into the hot holding station 20 awaiting below, and transporting the emptied basket 16 to a selected platform 46 above a fryer vat 42 (as determined by the gantry control 26). In such an embodiment, the basket discharge cycle can be completed in a time period of less than 20 seconds. The exemplary embodiment shown performs a basket discharge cycle as described here in about 16 seconds, for example. Furthermore, the gantry system 22 can complete both one of the basket loading cycles and one of the basket discharge cycles in a time period of less than 35 seconds (e.g., the exemplary embodiment performs one of each cycle in about 34 seconds total). This is an improvement in speed by over 40% as compared to conventional automated fryer designs. This arrangement allows for successful management of up to 6 or more baskets cooking food product simultaneously at the fryer 12, which can result, for example, in throughput levels of 150 pounds of cooked French fries an hour in one operational example.

It is envisioned that the basket loading and basket discharge cycles could include additional or fewer steps in other embodiments. Nevertheless, the gantry 24 is configured to manage the workflow of 6 or more baskets and cooking stations (platforms 46) at the fryer 12 simultaneously to provide an increased maximum cooking volume throughput of the cooking system 10. The automatic cooking system 10 therefore improves the field of cooking equipment and methodologies by limiting the need for operator intervention (and associate expense) while maximizing how much food product can be cooked and prepared within the standard space used by fryers in commercial setting kitchens. Additionally, as described next, the design of the gantry 24 in this cooking system 10 advantageously controls the baskets 16 during the rapid movements of the basket loading and discharge cycles to avoid uncontrolled pivoting or rotations and/or undesired impacts with other baskets 16 held at the cooking system 10. As such, the reliability and throughput is significantly improved even over other automatic fryer designs, one such version of which is described now for reference from previous developments of the original Applicant of the present application.

Figure 5A:
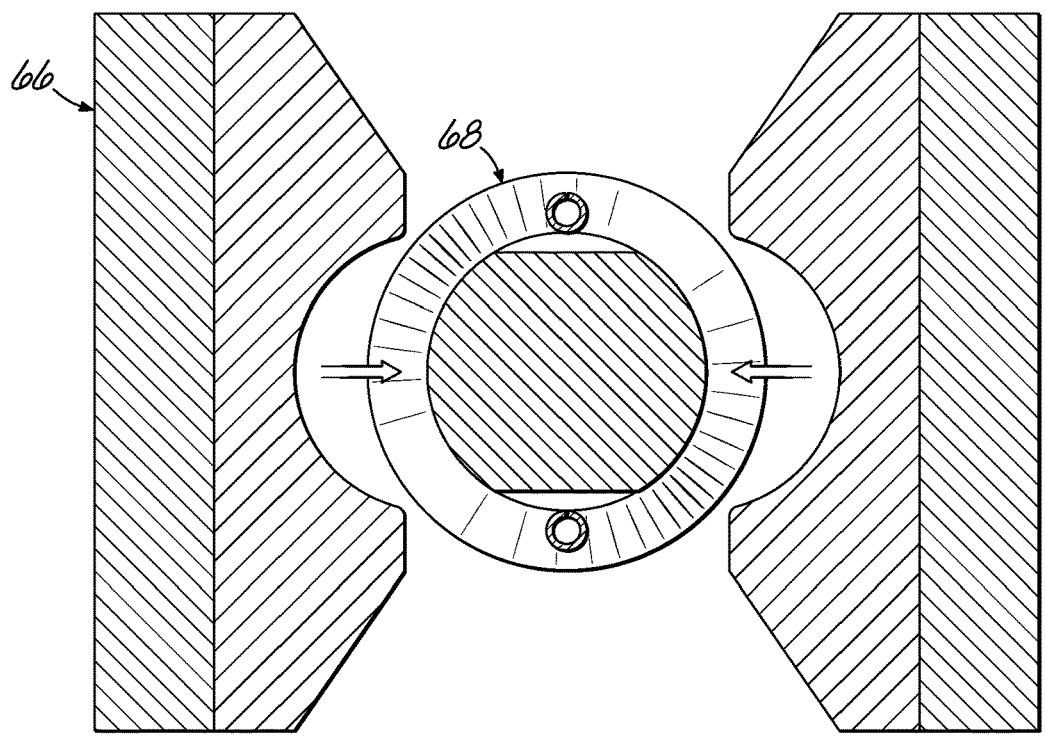
FIG. 5A is a front cross-sectional view of a clamping gripper of the gantry used with the automatic cooking system of FIG. 1, showing the clamping gripper in an open position.
Figure 5B:
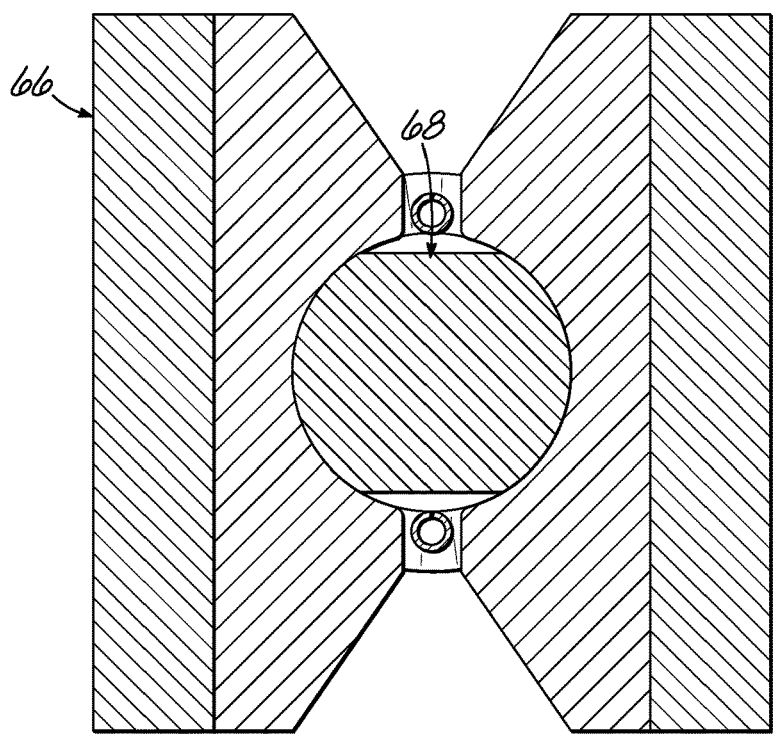
FIG. 5B is a front cross-sectional view of the clamping gripper of FIG. 5A, showing the clamping gripper clamped into engagement with the single pickup point of the basket.

Referring now to FIGS. 5A-5B, these Figures show engagement between the clamping gripper 66 of the gantry 24 and the single pickup point 68 of a basket 16 in accordance with the embodiments of this invention. Referring to FIG. 5A, the Figure shows an embodiment of a single pickup point 68 of a basket 16 facing in the direction of the gantry system 22. The single pickup point 68 is in the form of a spool that may be grasped by the clamping gripper 66 as shown and described here. The gantry system 22 includes a gantry 24 which, in turn, includes a clamping gripper 66. In one embodiment, the clamping gripper 66 is a two-piece clamping mechanism which engages with the single pickup point 68 of a basket 16 from opposing sides. Upon receiving a signal from the gantry control 26, the clamping gripper 66 engages and secures the single pickup point 68 of the basket 16 within the clamping gripper 66.

Referring to FIG. 5B, the Figure shows the clamping gripper 66 of the gantry 24 engaged with the single pickup point 68 of a basket 16. As shown, the two-piece clamping gripper 66 is clamped into engagement with the single pickup point 68. In an embodiment, the clamping gripper 66 clamps in engagement with the single pickup point 68 in such a way to prevent the basket 16 from uncontrollably rotating when the basket 16 is engaged with the gantry 24 (e.g., when the basket 16 is being moved from one position to another). For example, additional wires or structure may be provided adjacent the spool to help avoid any undesirable or uncontrolled pivoting of the basket 16 during engagement and movement with the gantry 24. In this regard, preventing uncontrolled rotational movements of the basket 16 during engagement with the gantry 24 serves to prevent a basket 16 engaged with the gantry 24 from impacting other baskets 16 at the system 10 or fryer 12, thereby preventing damage to baskets 16, the gantry 24, the fryer 12, or the system 10, as well as preventing food product spills and/or cycle delays associated with such spills and impacts. The improved speed and basket workflow management is therefore enabled in part by this engagement of baskets 16 with the gantry 24.

Referring now to FIGS. 6A-6H, another exemplary fryer 612 is shown for automatic cooking of food product and basket workflow management. The fryer 612 includes a front wall panel 644a, a left side wall panel 644b, a right side wall panel 644c, and a rear wall panel 644d adjacent a rear side of the fryer 612 to cover various interior portions such as a frame of the fryer 612 and/or various fryer components such as, for example, oil filtration and recirculation components. The illustrated fryer 612 includes three cooking chambers 648a-c, each configured to hold a cooking medium. As shown, each cooking chamber 648a-c is configured to hold a single basket 622a-b, for a total of three baskets 622a-b. However, more or fewer cooking chambers 648a-c are also envisioned, with each cooking chamber 648a-c being configured to hold one or more baskets 622a-b. At least one heating element 650 is disposed within each cooking chamber 648a-c. However, it is envisioned that each cooking chamber 648a-c may include any number of heating elements 650 in any arrangement, as may be desired. The heating element 650 is configured to heat the cooking medium to a predetermined temperature. An exhaust or vent hood 651 is positioned generally above the cooking chambers 648a-c. The illustrated fryer 612 includes touch screen controls 653a-c for each cooking chamber 648a-c. As shown, the fryer 612 includes a transport assembly 655 that is configured to raise and lower the baskets 622a-b out of and into the cooking chambers 648a-c and also to transfer the baskets 622a-b between a plurality of horizontal positions. By providing both vertical and horizontal movement to the baskets 622a-b with the transport assembly 655, the aforementioned hand-off of baskets 622a-b between dedicated vertical and horizontal transport assemblies may be eliminated.

The transport assembly 655 includes an overhead gantry 666 which travels horizontally along a track 667 fixed relative to the frame of the fryer 612. Horizontal movement of the gantry 666 along the track 667 may be enabled by an actuator (not shown). For example, the gantry 666 may be belt driven or gear driven in a manner similar to that described above with respect to the aforementioned horizontal transport assemblies. In one embodiment, the actuator of the gantry 666 and/or a motor thereof may be mounted behind the track 667. In any event, the gantry 666 includes a hollow body 669 having a shoulder 673 for engaging the track 667 such that the weight of the gantry 666 may be supported by the track 667. In this manner, the vertical position of the hollow body 669 of the gantry 666 may be fixed. As shown, the gantry 666 further includes a generally vertical telescoping arm 675 configured to be extendable, retractable, and/or rotatable relative to the hollow body 669. More particularly, the arm 675 may be vertically extended from and retracted into the hollow body 669, and may also be rotated about a vertical axis defined by the hollow body 669 and/or arm 675. Vertical and rotational movement of the arm 675 may be enabled by one or more actuators (not shown). For example, the arm 675 may be belt driven or gear driven in a manner similar to that described above with respect to the aforementioned vertical transport assemblies. In one embodiment, the actuator of the arm 675 and/or a motor thereof may be mounted within the hollow body 669 so as to move horizontally along the track 667 therewith.

The gantry 666 also includes a multi-handed manipulator 679 pivotably coupled to a base 681 which is, in turn, fixedly coupled to the arm 675. The illustrated base 681 includes a hollow sleeve 683 configured to rotatably receive a portion of the manipulator 679, such as a rod 685 thereof (FIG. 6G). Other suitable configurations may be used. In any event, the manipulator 679 may be rotated about a horizontal axis defined by the rod 685, for example. Rotational movement of the manipulator 679 may be enabled by one or more actuators (not shown). In one embodiment, the actuator of the manipulator 679 and/or a motor thereof may be mounted within one or more of the hollow body 669, the telescoping arm 675, and/or the base 681 so as to move horizontally along the track 667 therewith.

In the embodiment shown, the manipulator 679 includes two or more hands 687, 689 fixedly coupled to each other. As shown, the hands 687, 689 extend away from the rod 685 in generally opposite directions. In other embodiments, the hands 687, 689 may not be coupled to each other. In addition, or alternatively, more than two hands 687, 689 may be provided. For example, an alternative manipulator may include three hands offset from each other by approximately 120°.

Each hand 687, 689 includes a coupling 691 (FIG. 6G) for selectively attaching and releasing a basket 622a-b to and from the manipulator 679. For example, each coupling 691 may include a generally cylindrical protrusion configured to be received by a corresponding recess 693 of a handle 695 of a basket 622a-b. In one embodiment, frictional engagement between the protrusion 691 and the recess 693 may attach the manipulator 679 to the basket 622a-b. In addition, or alternatively, an auxiliary lock may be selectively engaged to assist in attaching the manipulator 679 to the basket 622a-b. For example, the handle 695 may include a permanent magnet (not shown) and the manipulator 679 may include one or more electromagnets (not shown) which may be selectively activated to magnetically attach the manipulator 679 to the basket 622a-b. In one embodiment, each coupling 691 may be configured to allow the corresponding basket 622a-b to rotate relative to the manipulator 679 about the coupling 691, such as under gravity, and/or may be configured to rotatably fix the corresponding basket 622a-b relative to the manipulator 679. For example, each coupling 691 may be configured to selectively rotatably fix and selectively rotatably release the corresponding basket 622a-b.

The motion of the baskets 622a-b will now be described in connection with FIGS. 6A-6H. Initially, the gantry 666 is positioned proximate the right-side wall panel 644c with the first hand 687 of the manipulator 679 attached to the first basket 622a via the corresponding coupling 691, while the second basket 622b is initially positioned in the second cooking chamber 648b with a rear downwardly facing hook 606 of the basket 622b engaging a support (not shown) for holding the basket 622b. The arm 675 may be initially oriented such that the first basket 622a extends laterally away from the fryer 612, such as for receiving uncooked food product from a freezer (not shown). The second basket 622b may contain food product (not shown) whose cooking time is nearing completion.

Figure 6A:
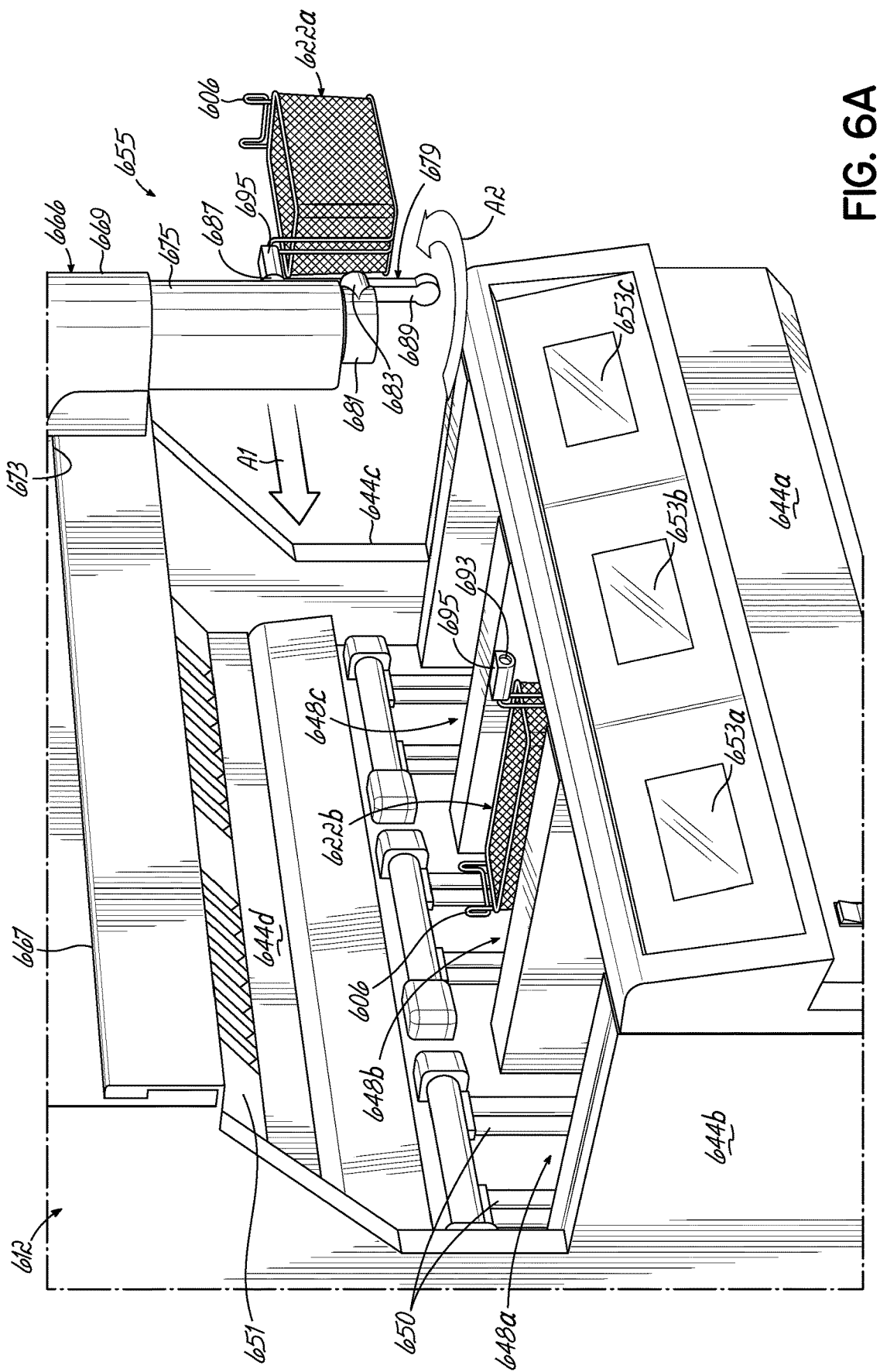
FIG. 6A is a front perspective view of an exemplary fryer in accordance with an alternative embodiment of the invention, showing a transport assembly having a multi-handed manipulator coupled to a first basket.

FIG. 6A shows the transport assembly 655 moving the first basket 622a laterally from proximate the right-side wall panel 644c to above the second cooking chamber 648b, as indicated by the arrow A1. During this time of travel, the arm 675 rotates counterclockwise about the vertical axis to align the first basket 622a directly above the second basket 622b, as indicated by the arrow A2.

Figure 6B:
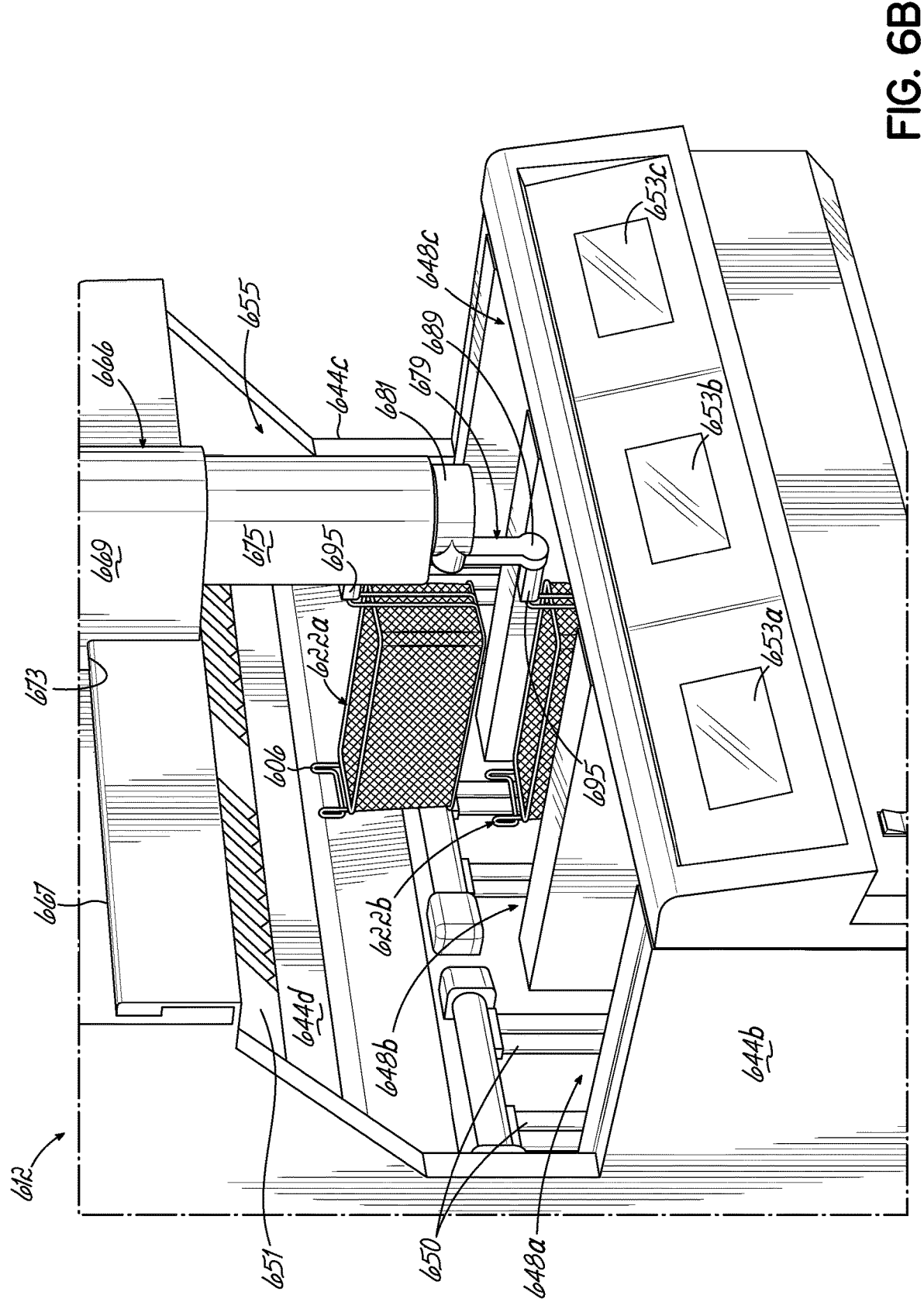
FIG. 6B is a front perspective view similar to FIG. 6A, with the manipulator coupled to the second basket while remaining coupled to the first basket.

FIG. 6B shows that upon reaching the second cooking chamber 648b, the second hand 689 of the manipulator 679 attaches to the second basket 622b via the corresponding coupling 691 while the first hand 687 of the manipulator 679 remains attached to the first basket 622a.

Figure 6C:
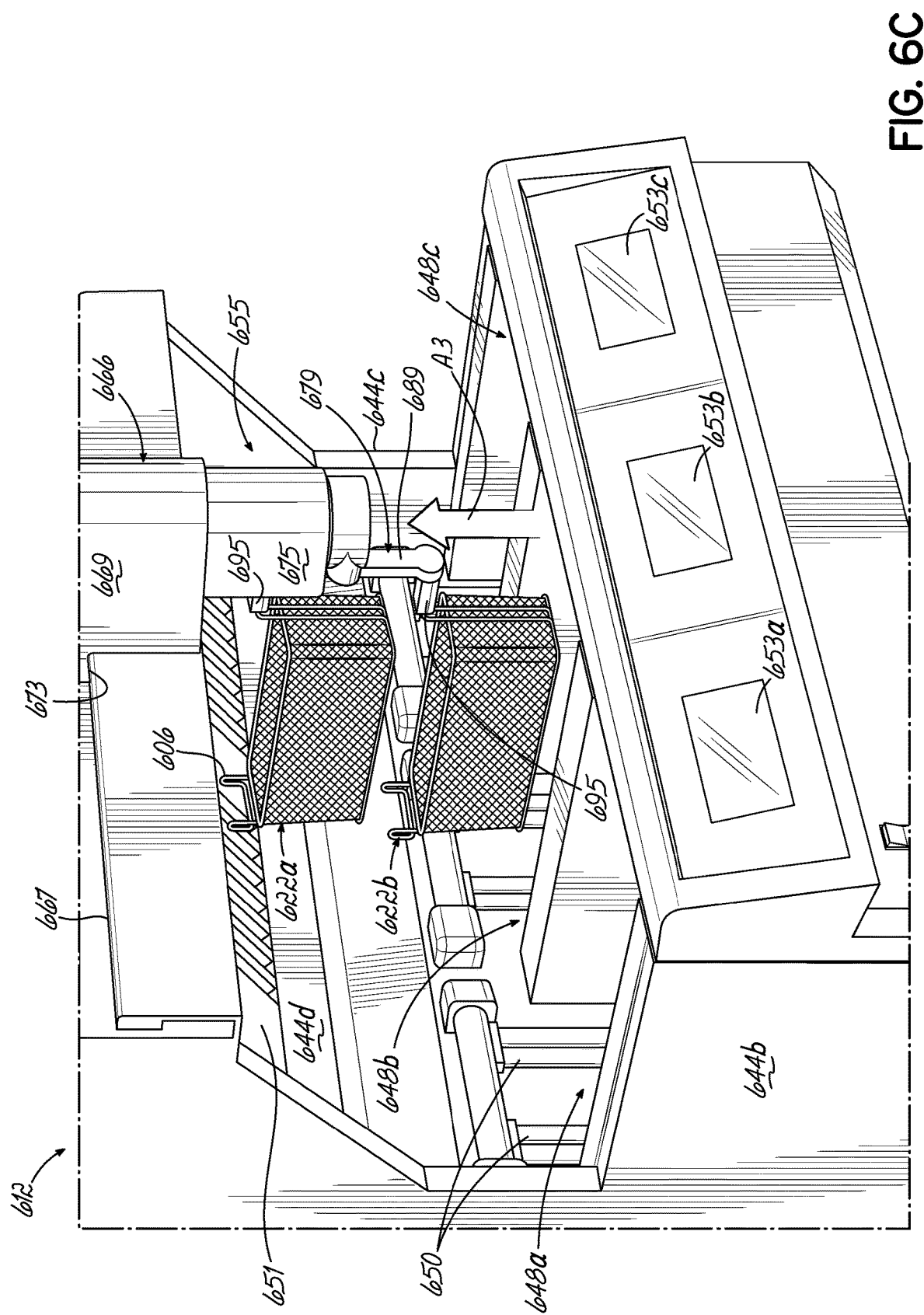
FIG. 6C is a front perspective view similar to FIG. 6B, with the transport assembly moving vertically upward to lift the second basket out of the fryer vat.

FIG. 6C shows the transport assembly 655 raising the baskets 622a-b via retraction of the arm 675 into the hollow body 669 of the gantry 666, as indicated by the arrow A3. In this manner, the transport assembly 655 raises the second basket 622b out of the second cooking chamber 648b.

Figure 6D:
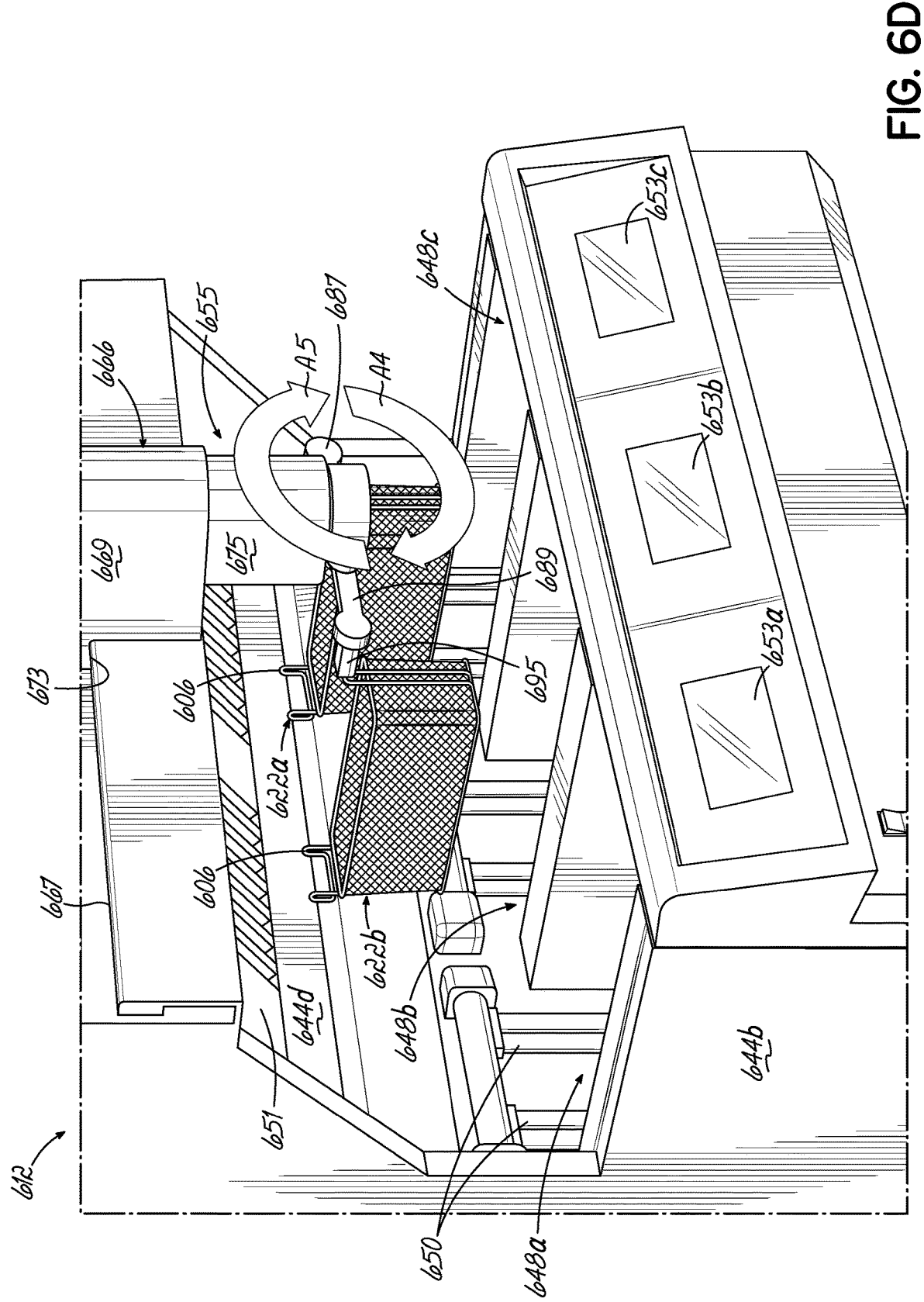
FIG. 6D is a front perspective view similar to FIG. 6C, with the manipulator rotating about a horizontal axis to change the heights of the first and second baskets such that the first basket is positioned relatively lower than the second basket.

FIG. 6D shows the manipulator 679 rotating clockwise about the horizontal axis, as indicated by the arrows A4, A5. During this rotation of the manipulator 679, the couplings 691 are configured to allow the baskets 622a-b to rotate relative to the manipulator 679 about the respective coupling 691, such that the weight of the food product contained in the baskets 622a-b may allow the baskets 622a-b to remain in a substantially level orientation while the manipulator 679 rotates. In this manner, the baskets 622a-b may avoid spilling the food product during this rotation.

Figure 6E:
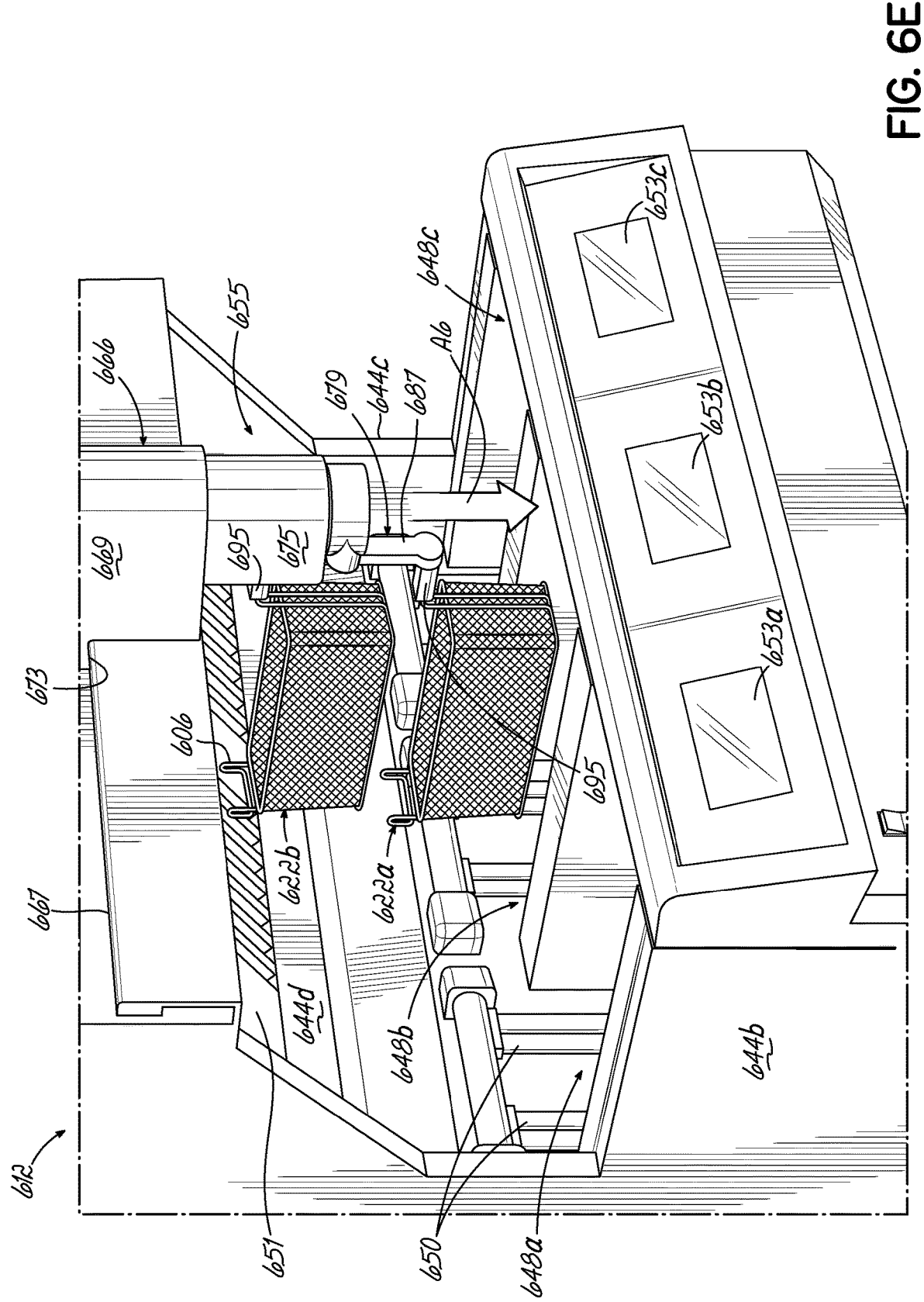
FIG. 6E is a front perspective view similar to FIG. 6D, with the transport assembly moving vertically downward to lower the first basket into the fryer vat.

FIG. 6E shows that upon rotating the manipulator 679 about the horizontal axis such that the vertical positions of the first and second baskets 622a-b have switched, the transport assembly 655 lowers the baskets 622a-b via extension of the arm 675 from the hollow body 669 of the gantry 666, as indicated by the arrow A6. In this manner, the transport assembly 655 lowers the first basket 622a into the second cooking chamber 648b for cooking the food product contained therein. When lowered into the second cooking chamber 648b, a rear downwardly facing hook 606 of the basket 622a may engage a support (not shown) for holding the basket 622a. While FIG. 6E shows that the vertical positions of the first and second baskets 622a-b have switched, alternative embodiments may simply change the heights of the first and second baskets 622a-b to position the first basket 622a relatively lower than the second basket 622b, such as in embodiments have more than two hands 687, 689.

Figure 6F:
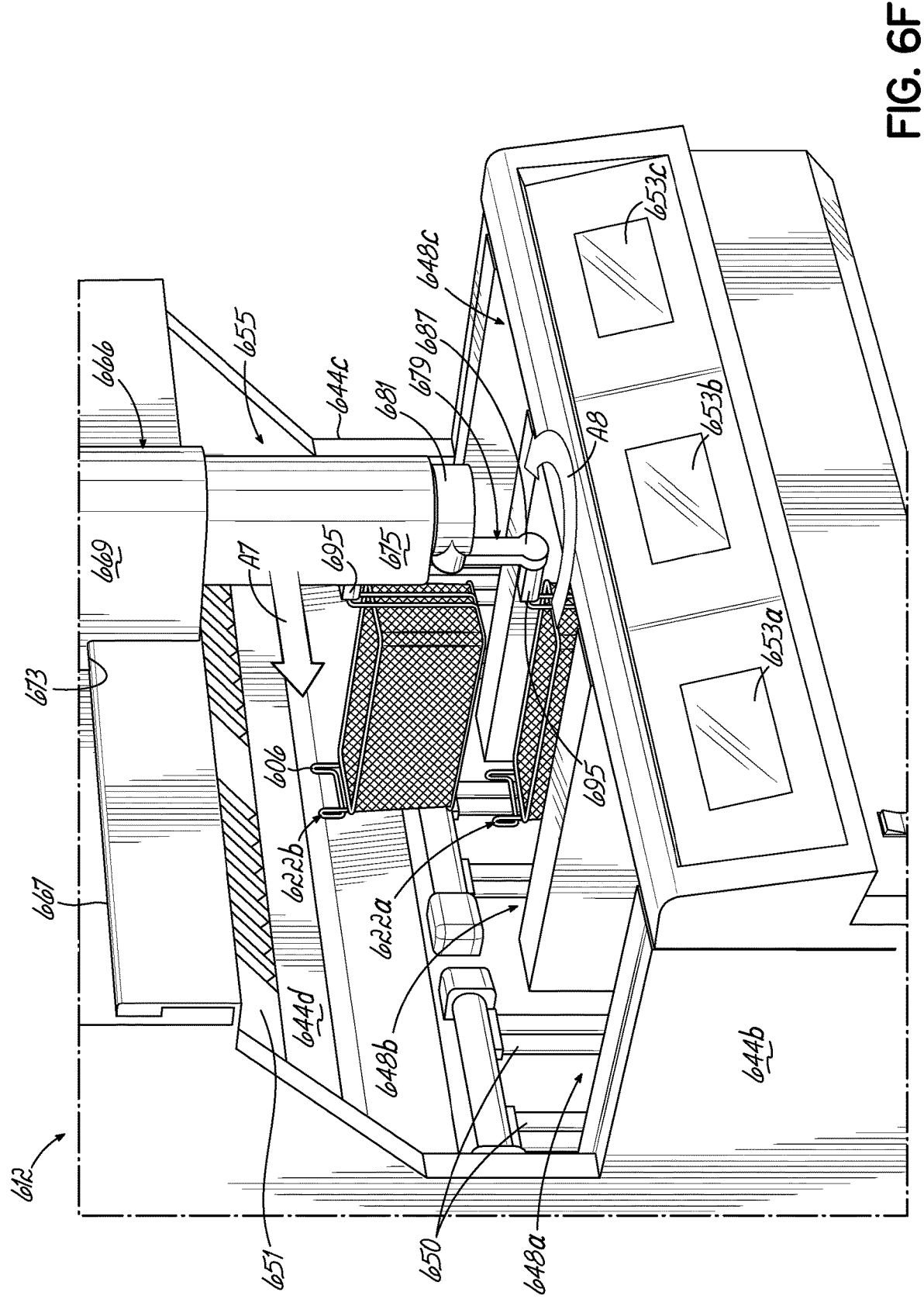
FIG. 6F is a front perspective view similar to FIG. 6E, with the manipulator decoupled from the first basket, the transport assembly rotating about the vertical axis and moving horizontally from the fryer vat toward a position proximate the left-side wall panel of the fryer.

FIG. 6F shows the transport assembly 655 moving the second basket 622b laterally from above the second cooking chamber 648b to a position proximate the left side wall panel 644b, as indicated by the arrow A7, with the first hand 687 of the manipulator 679 detached from the first basket 622a to leave the first basket 622a in the second cooking chamber 648b. During this time of travel, the arm 675 rotates counterclockwise about the vertical axis, such as to align the second basket 622b over a holding unit (not shown), as indicated by the arrow A8.

FIG. 6G shows that when proximate the left side wall panel 644b, the manipulator 679 rotates counterclockwise about the horizontal axis, as indicated by the arrow A9. During this rotation of the manipulator 679, the coupling 691 of the second hand 689 of the manipulator 679 is configured to rotatably fix the second basket 622b relative to the manipulator 679, such that this rotation of the manipulator causes the second basket 622b to tilt away from the substantially level orientation.

FIG. 6H shows the second basket 622b tilted as a result of the orientation of the manipulator 679 relative to the horizontal axis, such that the cooked food product carried by the second basket 622b may be dispensed therefrom into a holding unit.

After dispensing food product from the second basket 622b, the transport assembly 655 may return to a position proximate the right-side wall panel 644c and repeat the above process for subsequent batches of food product. While two baskets 622a-b are shown, it will be appreciated that additional baskets may be incorporated, such as for cooking food product in the first and third cooking chambers 648a, 648c.

The multi-handed manipulator 679 of the transport assembly 655 enables rapid placement of a basket 622a-b into a cooking chamber 648a-c immediately following removal of a basket 622a-b from that same cooking chamber 648a-c. In this regard, rather than being capable of only manipulating a single basket 622a-b at a time, which would require first moving the original basket 622a-b of cooked food product to a separate holding area before placing the next basket 622a-b into the cooking chamber 648a-c, the multi-handed manipulator 679 is able to place the next basket 622a-b into the cooking chamber 648a-c while continuing to hold the original basket 622a-b, prior to moving the original basket 622a-b to an unloading station, thereby maximizing the time that the cooking chamber 648a-c is used for cooking and minimizing down time to improve the throughput of the fryer 612. In one embodiment, this may save between approximately 10 and 20 seconds per batch as compared to a single-handed manipulator.

The double arm gantry embodiment of the fryer 612 shown in FIGS. 6A-6H improves production and food product throughput as compared to conventional fryers and systems. To this end, the fryer 612 manages the workflow of baskets 622a-b to allow for up to 6 baskets of food product to be cooked at the same time. The food product is cooked reliably and quickly to provide high throughput of desirable quality cooked foods to meet the customer demands in the restaurant setting.

As compared to this "double arm gantry" embodiment shown in FIGS. 6A-6H, the automated cooking system 10 of the first embodiment described above with reference to FIGS. 1-5B achieves several additional operational advantages. In the first embodiment (FIGS. 1-5B), the gantry system 22 engages with the baskets 16 in such a manner as to eliminate any rotational basket 16 swinging that may lead to adjacent baskets 16 hitting one another, which may occur with the double arm gantry design. The gantry system 22 also simplifies the movements needed when engaging with and transferring baskets 16 to and from the platforms 46 in the fryer 12. To this end, the gantry system 22 is not primarily responsible for vertical movements of baskets 16 into and out of the fryer 12, and complicated rotation mechanisms for managing two baskets 16 at the same time can be omitted from this version of the gantry system 22. Consequently, the cycle time needed for various basket 16 movement and drop-off and pickup actions is decreased even further by the automated cooking system 10 by an additional 30%-50%. The cooking system 10 achieves the increased production by efficiently managing the workflow of baskets 16 moving between a freezer 18, the fryer 12, and a hot holding station 20. The automated cooking system 10 and its methods of operation described herein therefore improve the fryer art in a significant manner to add the efficiencies with regard to both time and labor considerations and production levels required in modern restaurants without necessitating a significantly bigger fryer footprint.

Generally, many benefits may arise through use of the automated cooking system 10. The automated cooking system 10 allows the operator to perform other tasks while the automated cooking system 10 is working. Additionally, an automated cooking system 10 allows for improved quality control of the food product 14 (e.g., precise cooking time, more precise weight of product being cooked, optimized heat management by alternating product drops between the various cooking chambers, or synchronized mini-filtration during idle periods). Additionally, the automated cooking system 10 increases the hourly product throughput versus a manually-operated system. Further, the automated cooking system 10 provides superior up-time and predictive fault diagnostics due to continual baseline performance comparisons and configurable warning thresholds.

Additional benefits of the automated cooking system 10 include, for example, an improved operator experience, availability of manual override at any point of the process, easy cleaning (typical cooking chamber cleaning procedure where the actuator surfaces can be easily wiped down), the system 10 fits into customer's current fryer width footprint, the gantry fits under the 64 inch minimum hood clearance, minimal interference with existing fire suppression systems due to the design of the system 10 and fryer 12, making retrofit and site approvals easier, moving parts and controls being shielded from operator and extreme heat, optimized motions allowing for minimal speeds to reduce risk of operator contact, and being retrofittable to existing fryers.

In general overview, the routines executed by the system controller 25 (or a series of control elements as noted above in alternative embodiments) to implement the embodiments of the invention, whether implemented as part of an operating system or a specific application, component, program, object, module, or sequence of instructions, or a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations or elements embodying the various embodiments of the invention. Computer-readable program instructions for carrying out operations of the embodiments of the invention may be, for example, assembly language or either source code or object code written in any combination of one or more programming languages.

Various program code described herein may be identified based upon the application within which it is implemented in specific embodiments of the invention. However, it should be appreciated that any particular program nomenclature which follows is used merely for convenience, and thus the invention should not be limited to use solely in any specific application identified or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

With continued reference to FIG. 1, the program code embodied in any of the applications or modules described herein is capable of being individually or collectively distributed as a program product in a variety of different forms. In particular, the program code may be distributed using a computer-readable storage medium having computer-readable program instructions thereon for causing a processor to carry out the embodiments of the invention.

Computer-readable storage media, which is inherently non-transitory, may include volatile, non-volatile, removable, and non-removable tangible media implemented in any method or technology for storage of information, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatuses, or other devices to function in a particular manner, such that the instructions stored in the computer-readable medium produce an article of manufacture including instructions that implement the functions, acts, or operations specified in the flow-charts, sequence diagrams, or block diagrams. The computer program instructions may be provided to one or more processors of a general purpose computer, a special purpose computer, or another programmable data processing apparatus to produce a machine, such that the instructions, which execute via the one or more processors, cause a series of computations to be performed to implement the functions, acts, or operations specified in the flow-charts, sequence diagrams, or block diagrams.

While the present invention has been illustrated by the description of various embodiments thereof, and while the embodiments have been described in considerable detail, it is not intended to restrict or in any way limit the scope of the appended claims to such detail. Thus, the various features discussed herein may be used alone or in any combination. Additional advantages and modifications will readily appear to those skilled in the art. The invention in its broader aspects is therefore not limited to the specific details and illustrative examples shown and described. Accordingly, departures may be made from such details without departing from the scope of the general inventive concept.

What is claimed is:

1. A method for managing basket workflow during food preparation at an automated cooking system, which includes a gantry system including a gantry, a dispensing freezer, a fryer including a plurality of fryer vats each including at least one platform for receiving and moving a basket, and a hot holding station, the method comprising:
    performing, by the gantry system, a plurality of basket loading cycles, each basket loading cycle defined by at least the following: picking up an empty basket from one of the platforms at the fryer with the gantry, moving the gantry and the empty basket to the dispensing freezer, dropping off the empty basket at the dispensing freezer, picking up a filled basket from the dispensing freezer, moving the gantry and the filled basket to a selected one of the platforms at the fryer, and dropping off the filled basket onto the selected one of the platforms to allow the fryer to cook food product in the filled basket; and
    performing, by the gantry system, a plurality of basket discharge cycles, each basket discharge cycle defined by at least the following: picking up a filled basket containing food product that has been cooked by the fryer from one of the platforms at the fryer with the gantry, moving the gantry and the filled basket to the hot holding station, actuating the filled basket with the gantry to open a bottom of the filled basket and thereby discharge the cooked food product into the hot holding station to empty the basket, moving the gantry and the empty basket to another selected one of the platforms at the fryer, and dropping off the empty basket onto the another selected one of the platforms,
    wherein the automated cooking system prioritizes and orders the basket loading cycles and the basket discharge cycles for the gantry system to satisfy varying levels of demand for cooked food products from the automated cooking system.

2. The method of claim 1, further comprising:
    moving only one basket at a time with the gantry during the basket loading cycles and the basket discharge cycles.

3. The method of claim 2, further comprising:
    preventing uncontrolled rotational movements of any basket during engagement of the basket with the gantry, to thereby avoid impacts of the basket engaged with the gantry with any other basket at the automated cooking system.

4. The method of claim 3, wherein the steps of picking up a basket with the gantry in the basket loading cycles and the basket discharge cycles further comprises:
    clamping the gantry into engagement with only a single pickup point defined along a front surface of the basket.

5. The method of claim 1, wherein the fryer includes at least six platforms defining cooking stations for a basket at the plurality of fryer vats, and the method further comprises:
    managing workflow of at least six baskets simultaneously with the gantry system to move the at least six baskets between the dispensing freezer, the fryer, and the hot holding station to complete cooking cycles for food products loaded into the at least six baskets.

6. The method of claim 1, wherein the gantry system completes at least one of the basket loading cycles or one of the basket discharge cycles in a time period of less than 20 seconds.

7. The method of claim 1, wherein the gantry system completes both one of the basket loading cycles and one of the basket discharge cycles in a time period of less than 35 seconds.

8. The method of claim 1, further comprising:
    lowering a filled basket, by one of the platforms at the fryer, into a heated cooking medium within a corresponding fryer vat to cook the food products in the basket;
    maintaining the filled basket within the corresponding fryer vat for a cooking cycle time defined for cooking the food products in the basket; and
    lifting the filled basket, by the one of the platforms at the fryer, out of the heated cooking medium after the cooking cycle time has elapsed, to position the filled basket with cooked food products in a position ready for pickup by the gantry system.

9. The method of claim 1, wherein the dispensing freezer and the hot holding station are positioned on opposite lateral sides of the fryer, and the gantry system moves baskets laterally between the dispensing freezer, the hot holding station, and the plurality of fryer vats located between the dispensing freezer and the hot holding station.

10. The method of claim 1, wherein the baskets may be are loaded with different types of food products for cooking cycles, and the step of performing a plurality of basket discharge cycles further comprises:
    moving, during one of the basket discharge cycles, a first filled basket that contains a first type of food product to a first height above a receptacle at the hot holding station, such that actuation of the first filled basket to open with the gantry causes discharge of the first type of food product into the receptacle by dropping the first type of food product from the first height; and
    moving, during another of the basket discharge cycles, a second filled basket that contains a second type of food product to a second height above the receptacle at the hot holding station, such that actuation of the second filled basket to open with the gantry causes discharge of the second type of food product into the receptacle by dropping the second type of food product from the second height,
    wherein the first type of food product is different than the second type of food product, and the first and second heights are different.

11. The method of claim 1, wherein the dispensing freezer includes a staging shelf and a basket movement receptacle, and during each of the basket loading cycles:
    the gantry system drops off the empty basket onto the staging shelf; and
    the gantry system picks up the filled basket from the basket movement receptacle,
    wherein the empty basket and the filled basket are different baskets at the dispensing freezer.

12. The method of claim 11, wherein between basket loading cycles, the method further comprises, at the dispensing freezer:
moving the basket movement receptacle to a position adjacent the empty basket on the staging shelf;
pivoting the staging shelf out of a movement path of the basket movement receptacle such that the empty basket is supported on the basket movement receptacle;
moving the empty basket with the basket movement receptacle to a filling location at the dispensing freezer where the empty basket is filled with food product, and to a pickup position after the basket is filled with food product for pickup by the gantry system in a subsequent one of the basket loading cycles.

13. A method for managing basket workflow adjacent a dispensing freezer during food preparation of an automated cooking system, the automated cooking system including a staging shelf and a basket movement receptacle, and the method comprising:
receiving an empty basket from a gantry of the automated cooking system at the staging shelf;
moving the basket movement receptacle to a position adjacent the empty basket on the staging shelf;
pivoting the staging shelf out of a movement path of the basket movement receptacle such that the empty basket is supported on the basket movement receptacle;
moving the empty basket with the basket movement receptacle to a filling location at the dispensing freezer where the empty basket is filled with food product to become a filled basket;
holding the filled basket with the basket movement receptacle at a pickup position where the gantry picks up the filled basket; and
pivoting the staging shelf back to a deployed position so that the staging shelf is ready to receive another empty basket from the gantry.

14. The method of claim 13, wherein the basket movement receptacle defines a generally U-shaped support surrounding an open slot facing towards the staging shelf, and the method further comprises:
transferring the empty basket from support on the staging shelf to support by the basket movement receptacle during the steps of moving the basket movement receptacle to the position adjacent the empty basket and pivoting the staging shelf out of the movement path of the basket movement receptacle, wherein the staging shelf pivots, through the open slot of the basket movement receptacle, from a horizontal orientation to a vertical orientation.

15. The method of claim 14, wherein the staging shelf and the basket movement receptacle are sized such that:
the basket movement receptacle moves along the movement path past the staging shelf in either the horizontal or vertical orientations when the basket movement receptacle is not engaged with a basket, and
the basket movement receptacle moves along the movement path past the staging shelf only when the staging shelf is in the vertical orientation when the basket movement receptacle is engaged with a basket.

16. An automated cooking system, comprising:
a fryer including a plurality of fryer vats each configured to hold a cooking medium and each including at least one platform for receiving and moving a basket into and out of the cooking medium;
a dispensing freezer positioned adjacent to one lateral side of the fryer;
a hot holding station positioned adjacent to an opposite lateral side of the fryer;
a plurality of baskets, each basket of the plurality of baskets including an openable bottom and configured to receive and hold food products during cooking cycles at the fryer; and
a gantry system including a gantry control operatively coupled to a gantry configured to engage and move each of the baskets, wherein the gantry control operates the gantry system to:
perform a plurality of basket loading cycles, each basket loading cycle defined by at least the following: picking up an empty basket from one of the platforms at the fryer with the gantry, moving the gantry and the empty basket to the dispensing freezer, dropping off the empty basket at the dispensing freezer, picking up a filled basket from the dispensing freezer, moving the gantry and the filled basket to a selected one of the platforms at the fryer, and dropping off the filled basket onto the selected one of the platforms to allow the fryer to cook food product in the filled basket; and
perform a plurality of basket discharge cycles, each basket discharge cycle defined by at least the following: picking up a filled basket containing food product that has been cooked by the fryer from one of the platforms at the fryer with the gantry, moving the gantry and the filled basket to the hot holding station, actuating the filled basket with the gantry to open the openable bottom of the filled basket and thereby discharge the cooked food product into the hot holding station to empty the basket, moving the gantry and the empty basket to another selected one of the platforms at the fryer, and dropping off the empty basket onto the another selected one of the platforms,
wherein the gantry control prioritizes and orders the basket loading cycles and the basket discharge cycles for the gantry system to satisfy varying levels of demand for cooked food products from the fryer.

17. The automated cooking system of claim 16, wherein each of the plurality of baskets further includes a single pickup point facing towards the gantry system, and the gantry system includes a clamping gripper that clamps into engagement with the single pickup point of one of the baskets to move only one of the baskets at a time during the basket loading cycles and the basket discharge cycles.

18. The automated cooking system of claim 17, wherein the clamping gripper of the gantry system engages with each basket in such a manner to prevent uncontrolled rotational movements of the basket during engagement of the basket with the gantry, to thereby avoid impacts of the basket engaged with the gantry with any other basket at the automated cooking system.

19. The automated cooking system of claim 16, wherein adjacent the dispensing freezer, the cooking system further comprises:
a staging shelf, which is movable between a generally horizontal deployed position configured to receive an empty basket from the gantry system and a generally vertical stowed position; and
a basket movement receptacle, which is configured to pick up the empty basket from the staging shelf and move it to at least one of a filling location or a pickup position such that the empty basket is refilled with food products to be cooked and then picked up by the gantry system.

20. The automated cooking system of claim 19, wherein the basket movement receptacle defines a generally U-shaped support surrounding an open slot facing towards the staging shelf, such that the staging shelf pivots through the open slot from the deployed position to the stowed position to transfer the empty basket to the basket movement receptacle when the basket movement receptacle is positioned adjacent the staging shelf and the empty basket.

21. A method for managing basket workflow during food preparation at an automated cooking system, which includes a gantry system including a gantry, a dispensing freezer, a fryer including a plurality of fryer vats each including at least one platform for receiving and moving a basket, and a hot holding station, the method comprising:

performing, by the gantry system, a basket loading cycle, each basket loading cycle defined by at least the following: picking up a filled basket from the dispensing freezer with the gantry, moving the gantry and the filled basket to a selected one of the platforms at the fryer, and dropping off the filled basket onto the selected one of the platforms to allow the fryer to cook food product in the filled basket; and performing, by the gantry system, a basket discharge cycle, each basket discharge cycle defined by at least the following: picking up a filled basket containing food product that has been cooked by the fryer from one of the platforms at the fryer with the gantry, moving the gantry and the filled basket to the hot holding station, actuating the filled basket with the gantry to open a bottom of the filled basket and thereby discharge the cooked food product into the hot holding station to empty the basket, wherein the automated cooking system prioritizes and orders the basket loading cycles and the basket discharge cycles for the gantry system to satisfy varying levels of demand for cooked food products from the automated cooking system.

22. The method of claim 21, wherein the basket loading cycle further includes picking up an empty basket from one of the platforms at the fryer with the gantry, moving the gantry and the empty basket to the dispensing freezer, and dropping off the empty basket at the dispensing freezer, and wherein the basket discharge cycle further includes moving the gantry and the empty basket to another selected one of the platforms at the fryer, and dropping off the empty basket onto the another selected one of the platforms.

23. The method of claim 22, wherein the gantry system completes at least one of the basket loading cycles or one of the basket discharge cycles in a time period of less than 20 seconds.

24. The method of claim 22, wherein the gantry system completes both one of the basket loading cycles and one of the basket discharge cycles in a time period of less than 35 seconds.

* * * * *